United States Patent [19]

Cheney et al.

[11] 4,000,510
[45] Dec. 28, 1976

[54] SYSTEM FOR STORAGE AND RETRIEVAL OF VIDEO INFORMATION ON A CYCLICAL STORAGE DEVICE

[75] Inventors: Walter J. Cheney, Portola Valley; Alan G. Grace, San Carlos; James W. Jones, Woodside, all of Calif.

[73] Assignee: Ampex Corporation, Redwood City, Calif.

[22] Filed: June 2, 1975

[21] Appl. No.: 583,215

[52] U.S. Cl. .......................... 360/33; 178/DIG. 22; 340/172.5; 360/19; 360/72
[51] Int. Cl.$^2$ ................... H04N 5/78; G11B 27/30; G11B 27/32
[58] Field of Search ................. 360/14, 18, 19, 33, 360/35, 72; 178/6.6 DD, DIG. 22; 340/172.5

[56] References Cited

UNITED STATES PATENTS

| | | | |
|---|---|---|---|
| 3,599,178 | 8/1971 | Jackson | 340/172.5 |
| 3,614,333 | 10/1971 | Iwata | 178/6.6 DD |
| 3,631,421 | 12/1971 | Perkins | 360/72 |
| 3,637,928 | 1/1972 | Poulett | 178/6.6 DD |
| 3,740,463 | 6/1973 | Youngstrom et al. | 360/19 |
| 3,743,793 | 7/1973 | Emerson | 360/72 |
| 3,745,264 | 7/1973 | Emerson | 360/18 |
| 3,748,381 | 7/1973 | Strobele et al. | 178/6.6 DD |
| 3,792,194 | 2/1974 | Wood et al. | 178/6.6 DD |
| 3,931,457 | 1/1976 | Mes | 178/6.6 DD |

Primary Examiner—Raymond F. Cardillo, Jr.

[57] ABSTRACT

A magnetic disc has a plurality of video track segments for storing distinct fields of video information. A look-up track is provided on the disc and segmented to store indirect address data which may be represented by random numbers, and which are related to the video information fields. Both the look-up track segments and the video track segments are numbered sequentially. Each video track segment is permanently associated with a look-up track segment.

A movable transducer is associated with both the video tracks and the look-up track. A counter circuit is provided to indicate periodically the instant look-up segment numbers with respect to the instant position of the rotating cyclical storage device and in synchronism therewith. A first comparator circuit compares an indirect address input request with the indirect addresses recorded on the look-up track. Responsive to an output from the first comparator circuit, a buffer circuit stores an instant look-up segment number and transfers it to a control circuit. A control signal from the control circuit is sent to a transducer positioning device which moves the transducer to the corresponding video track segment.

A look-up decoder circuit is designed to sense a first empty segment automatically and periodically. A new video picture information is stored on the video track segment corresponding to that first empty look-up track segment.

Data bits are stored on the back porch of the horizontal sync pulses on consecutive lines of the video information. A circuit is provided to extract these data bits and restore the look-up track if accidentally erased.

20 Claims, 14 Drawing Figures

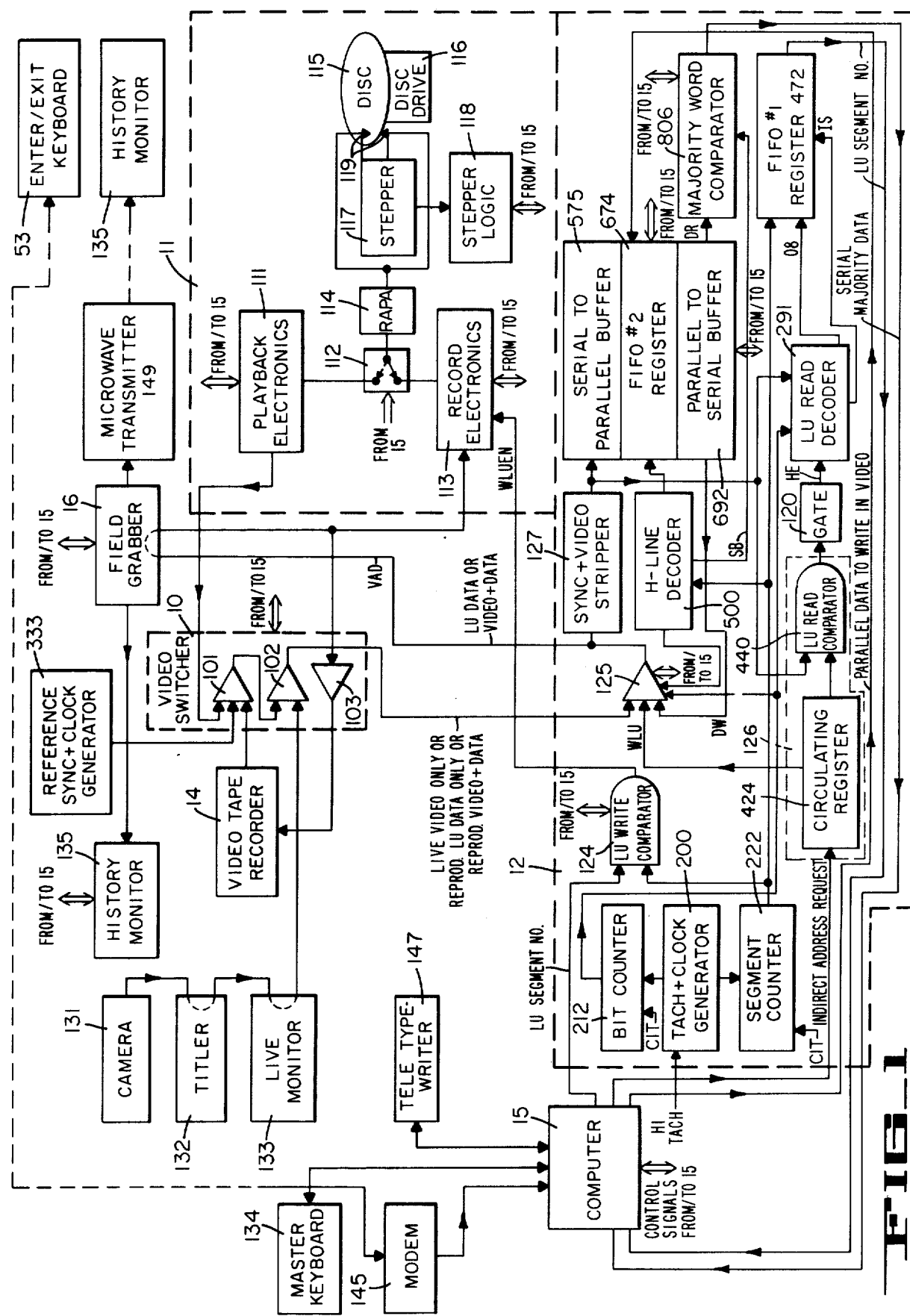

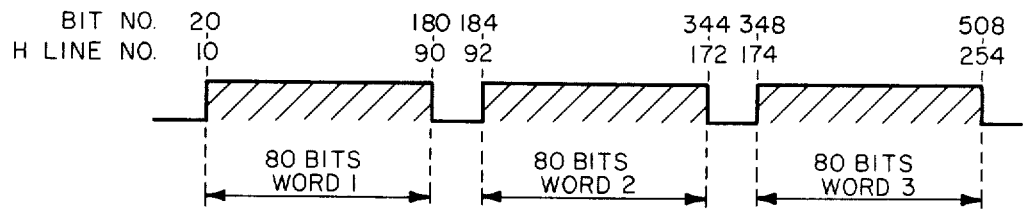
FIG_2A
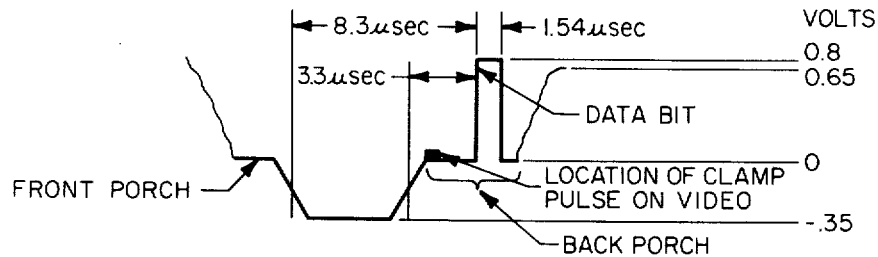
FIG_2B
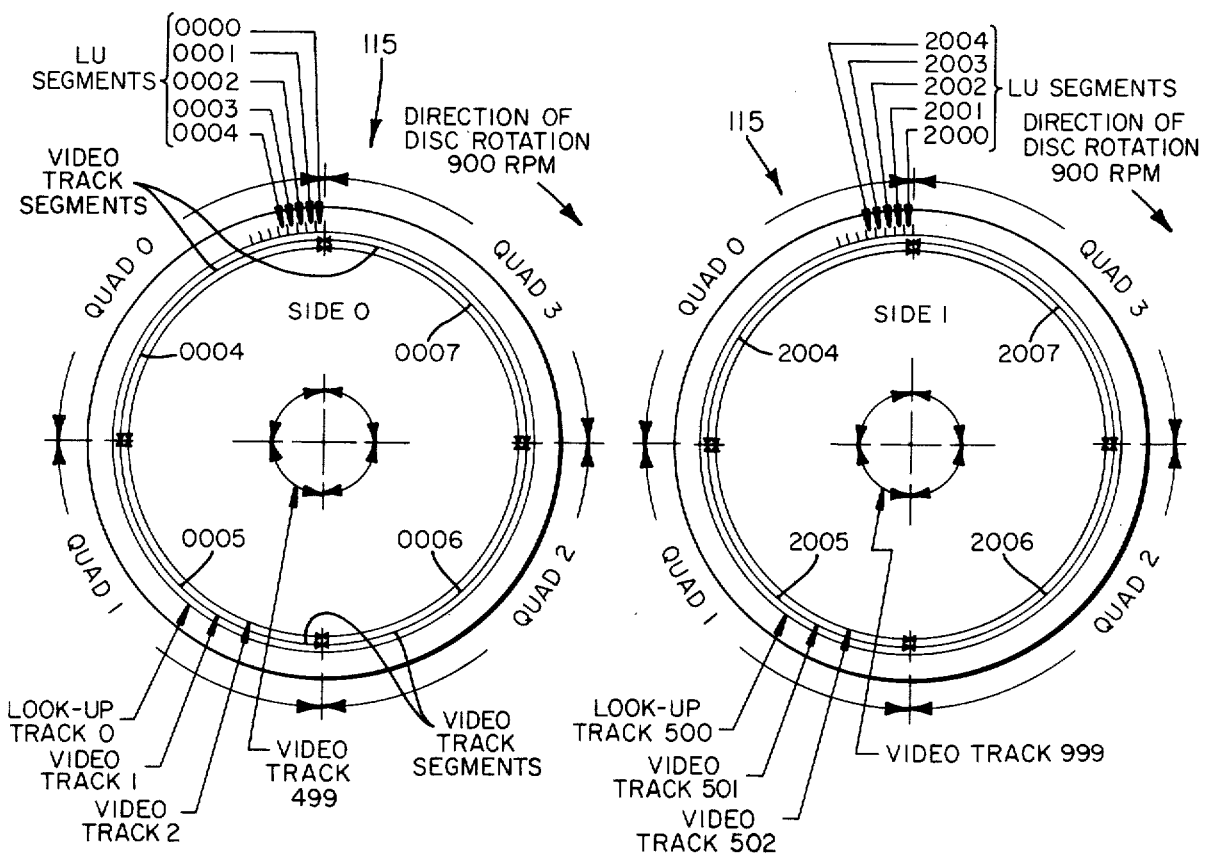
FIG_3A  FIG_3B

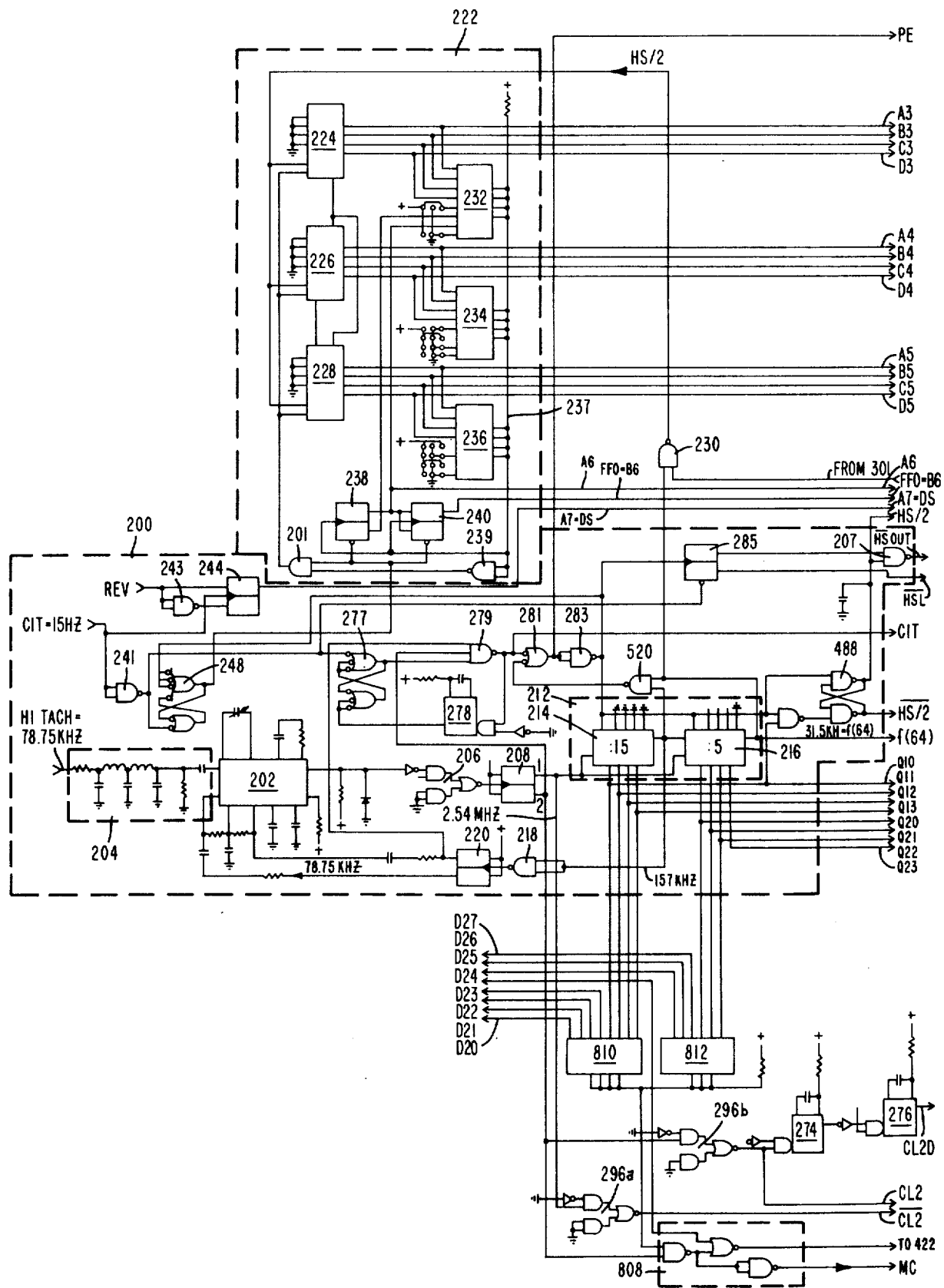
FIG_6A

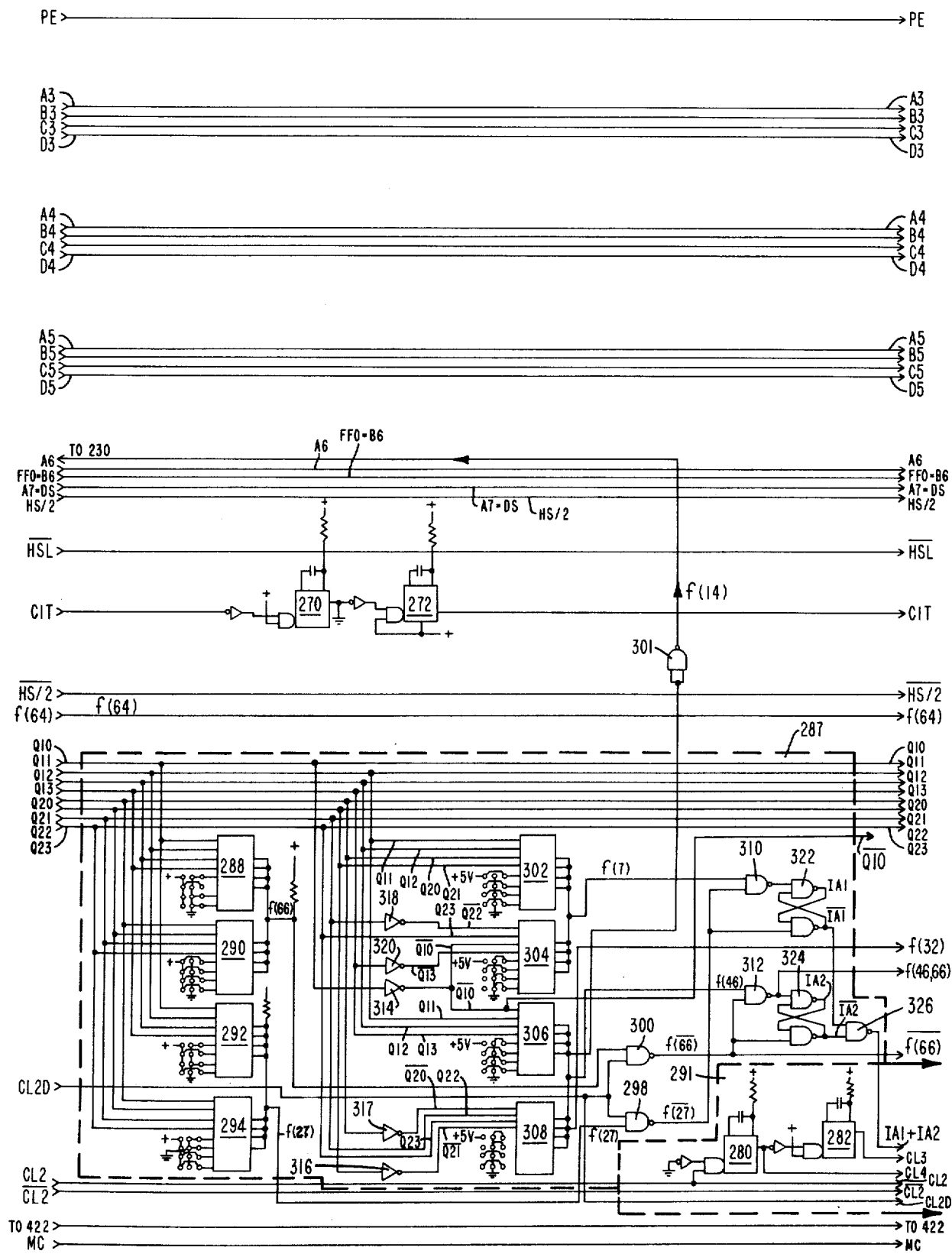
FIG_6B

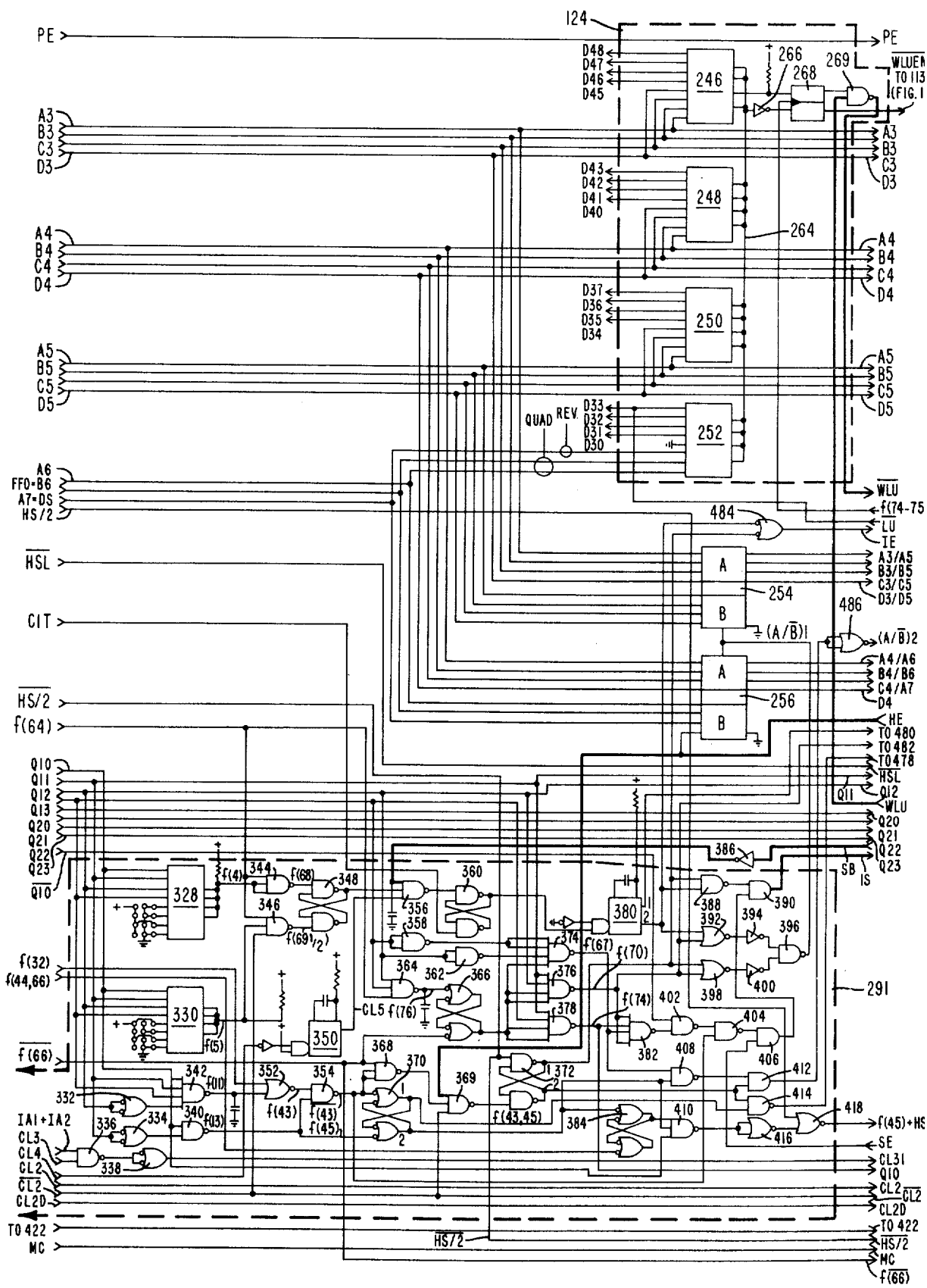
FIG_6C

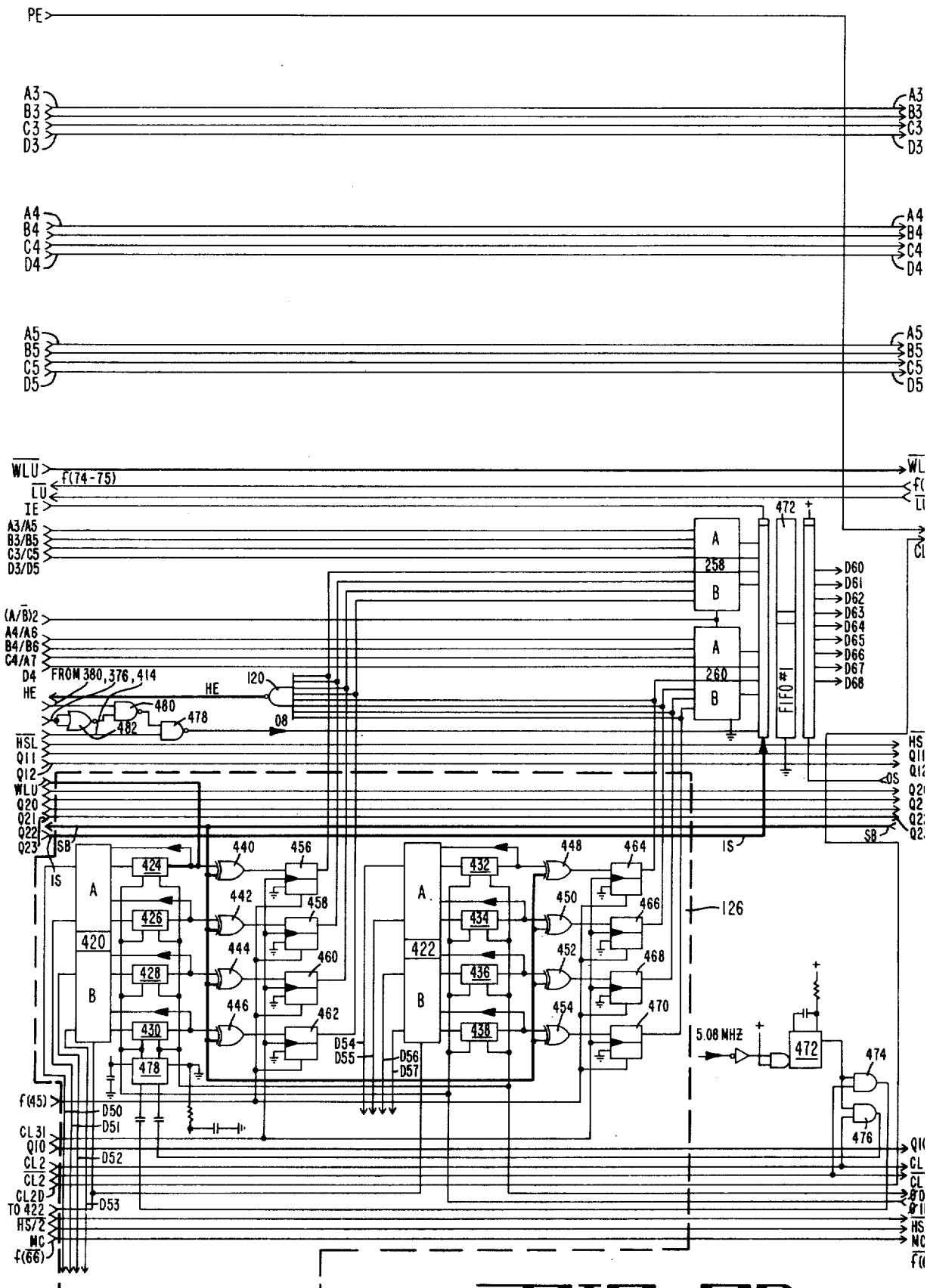

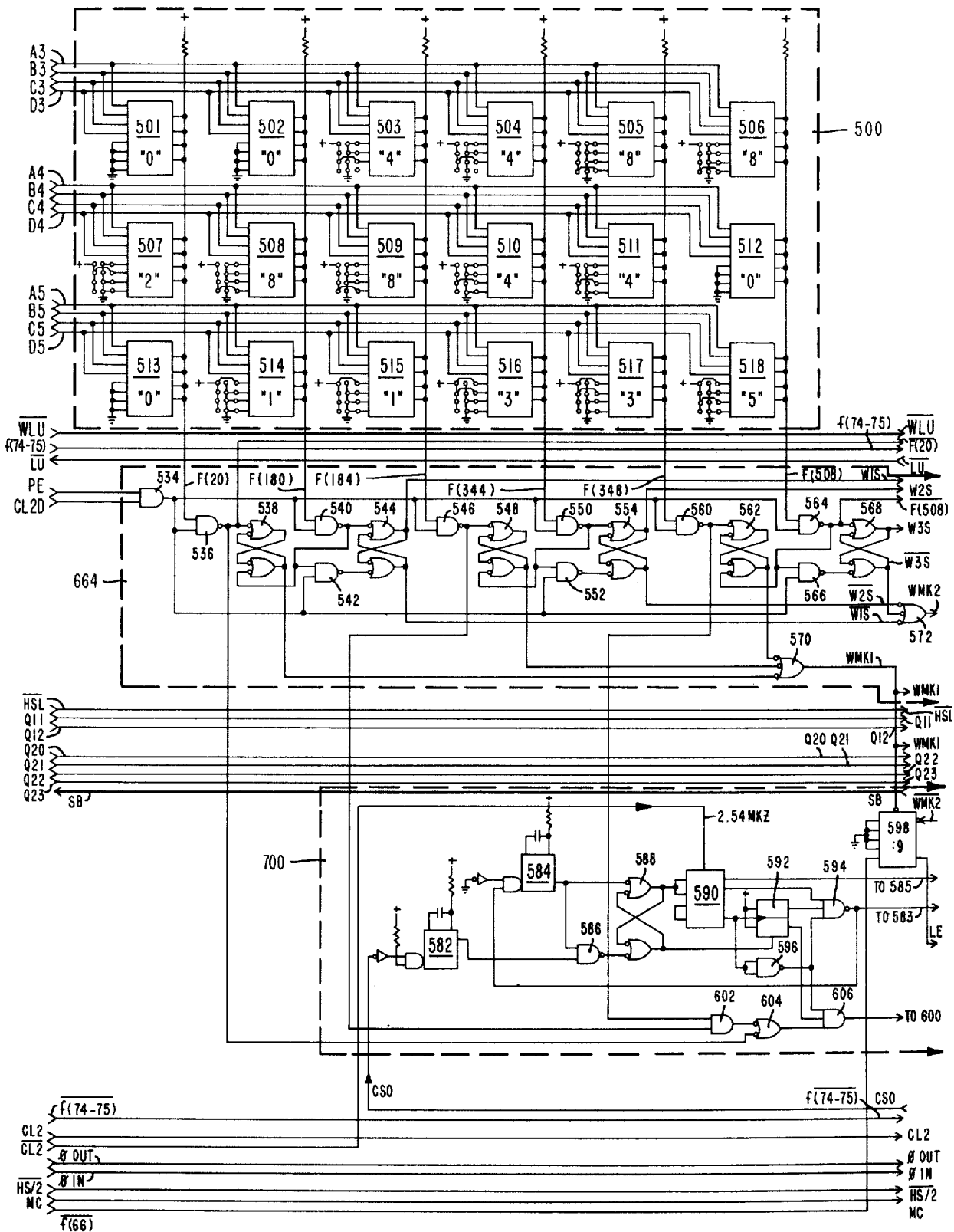
FIG_6E

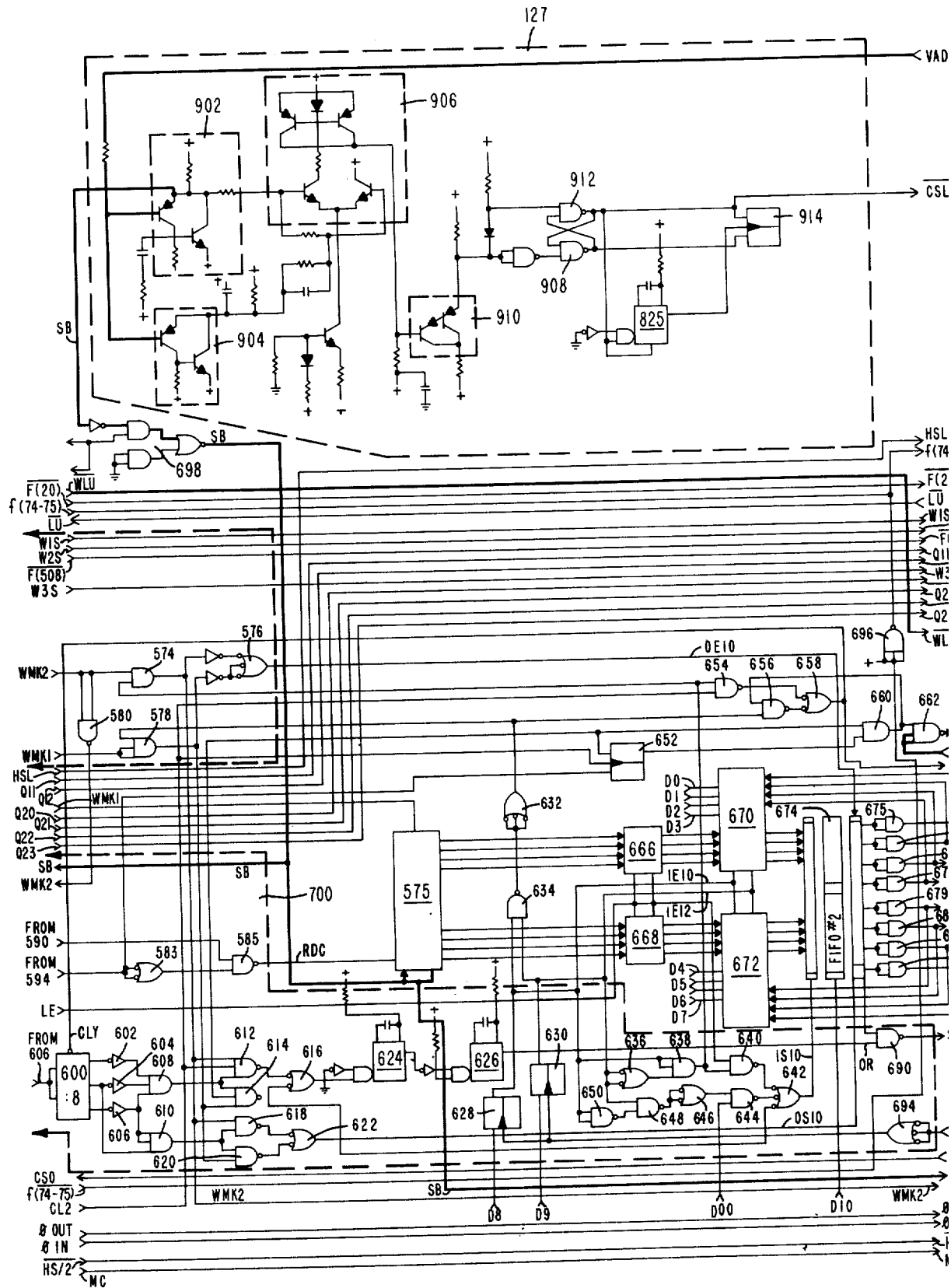
FIG_6F

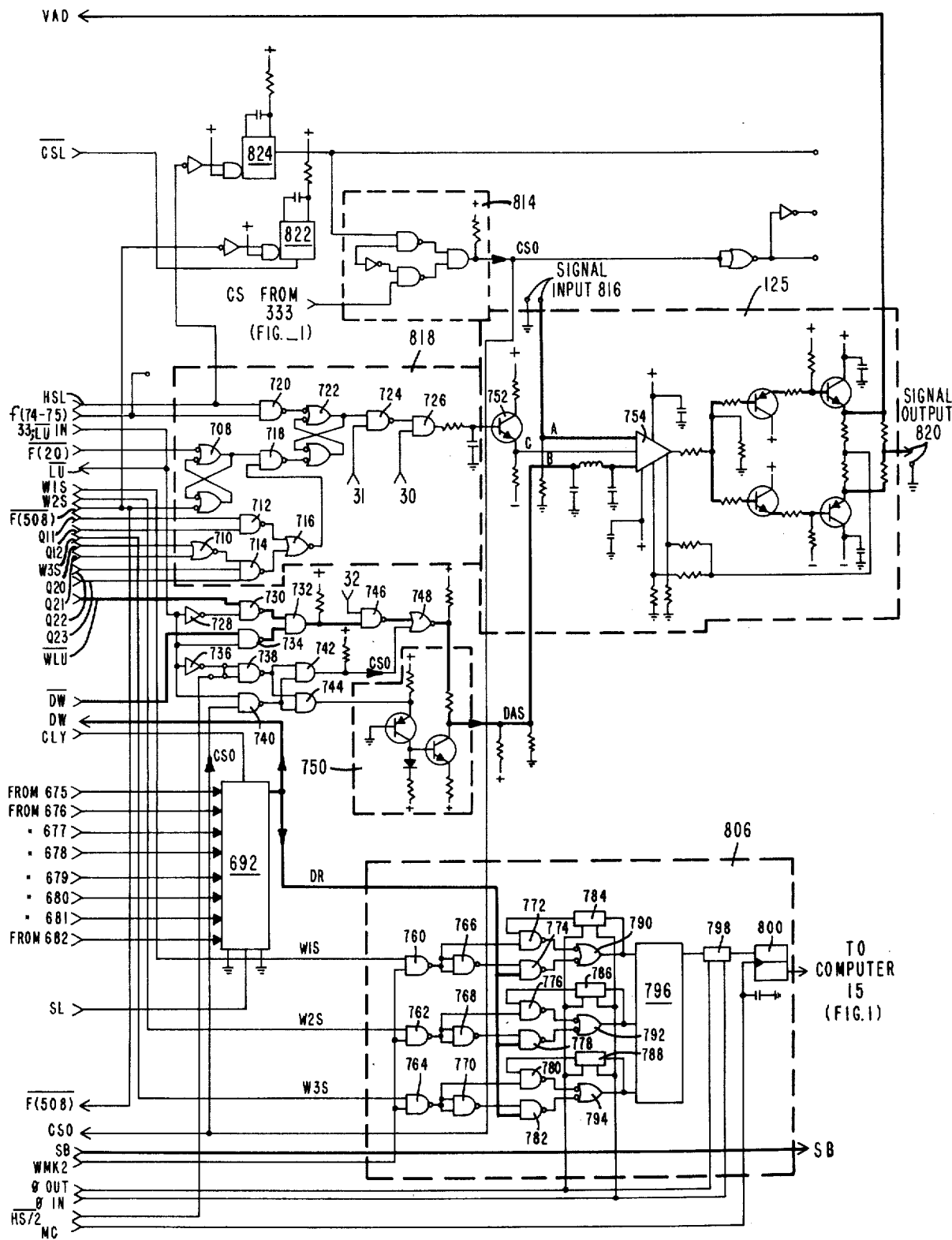
FIG_66

SYSTEM FOR STORAGE AND RETRIEVAL OF VIDEO INFORMATION ON A CYCLICAL STORAGE DEVICE

The invention herein described was made in the course of a contract with the Department of the U.S. Air Force.

BACKGROUND OF THE INVENTION

A great variety of systems for storing and retrieving digital information on a cyclical magnetic storage device such as disc or drum is known in the art. A comprehensive description of various digital data storage methods and addressing thereof can be found e.g. in IBM Manual File No. S-360-30, 1972, Order No. GC26-3746-1; reference is made to pg. 85–101 or in IBM System 360/Operating System, File No. S-360-20, 1971, Order No. GC28-6535-7; reference is made to pg. 34. These prior art systems and methods are designed to store large amounts of digital data but they are not suitable for indexing, storage and retrieval of video information.

A prior art digital data storage and addressing system on a cyclical storage device is described, for example, in the U.S. Pat. No. 3,631,421. In this patent a magnetic disc for storing data and a method of sectoring that disc for addressing purposes is described. The disc has a separate address track on which the more significant digits of the addresses are recorded in binary form. They are compared with the more significant digits of the wanted locations. The less significant digits are compared by a binary counter. The disc has also a separate clock track which serves as a source of reference pulses. The address track is prerecorded permanently and, therefore, it is not suitable for random or indirect addressing purposes. Besides that limitation, two fixed transducer heads are associated with the clock and address track, respectively. This latter arrangement is inconvenient when removing or changing the disc due to necessary alignment of the fixed heads. Furthermore, this prior art storage and addressing system is not suitable for video information storage and retrieval.

SUMMARY OF THE INVENTION

The present invention is related to a system for storing video information on a magnetic cyclical storage device, such as drum or disc in analog form and for retrieving that information therefrom.

It is a particular feature of the present invention that one or more random code numbers representing indirect addresses in digital form related to particular fields or frames of the video information are stored on one or more separate look-up tracks of the same cyclical storage device which stores the video information. Both the video tracks and the look-up track are segmented sequentially. Each particular segment of the look-up track is permanently associated with a particular segment of a video track.

It is another particular feature of the present invention that the address information related to a particular field of video information is also stored redundantly in digital form within the horizontal blanking intervals of that particular field. This feature of the invention constitutes a back-up for the look-up track which may be restored therefrom when necessary.

A microcomputer is utilized to store data necessary for the data flow throughout the system and to issue signals to control the operation of the various parts of the system in accordance with the instant mode of operation.

An encoder/decoder interface subsystem has been designed to generate various timing signals necessary to synchronize the data flow to and from the disc with the rotation of the disc and to adapt the rate of flow of relatively slow parallel data from the computer to the high speed serial data transferred to the disc and vice versa. The encoder/decoder subsystem includes buffers to compensate for a difference in the rate of flow of information, which buffers are controlled by these timing signals.

The present invention represents an extremely fast, flexible and highly reliable system for storage and retrieval of video information. The average access time for an enter/exit request is 2 seconds. Multiple requests, if entered simultaneously, are accessed at the same time. The time necessary for the system to record a picture information, including recording of data in the picture and on the look-up track, or for deleting a picture information and data from the file, respectively, is 5 seconds.

The look-up track represents a serial memory storing indirect addresses. It does not require additional addressing for searching the indirect addresses stored therein. The indirect addresses may be represented by random numbers which are unrelated with each other or with the information they are associated with, except for the segment location on the cyclical storage device.

The system provides for multiple simultaneous requests and handles these requests without additional delay.

The address memory of the system is expandable without additional cost, since any number of look-up tracks may be added on the storage device.

The full capacity of the storage device is utilized all the time, since the system provides for identification of a first empty video track segment automatically at every search of the look-up track and the next video picture information to be stored in the file is stored in this segment.

The recording and reproducing system associated with the storage device is common for both the video information and digital address data storage and retrieval.

Data is recorded redundantly in the video information. The system provides for restoration of the look-up track utilizing the data recorded in video.

Other advantages and features of the present invention will become apparent from the detailed description and accompanying drawings in which:

FIG. 1 is a block diagram of a preferred embodiment of the present invention.

FIG. 2a is a diagram of the data format utilized for redundant recording in the video signal.

FIG. 2b is a diagram showing the location of a data bit recorded on the "back porch" of the horizontal sync pulse.

FIG. 3a and 3b are diagrams showing the disc format.

FIG. 6a to 6g are consecutive parts of a detailed diagram showing an encoder/decoder interface subsystem of the preferred embodiment.

FIGS. 6a to 6g are arranged to form a complete diagram.

DESCRIPTION OF THE PREFERRED EMBODIMENT

Figure 4:
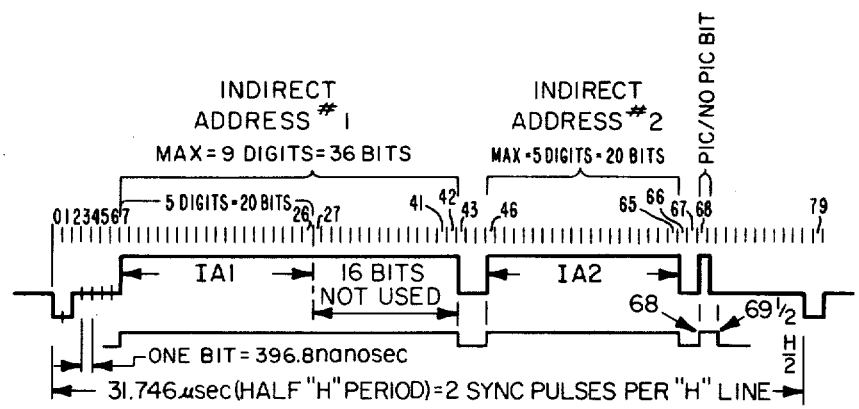
FIG. 4 is a diagram showing the data format utilized for recording on the look-up track.

A system for storage and retrieval of video information, as embodied in the present invention, is particularly adapted for use in a system for identification of personnel authorized to enter certain restricted areas such as in military installations, industrial plants, computer centers, etc. It is to be understood, however, that the system according to the invention is not limited to the above-listed examples, and may be utilized for video information storage and retrieval purposes in general.

Examples of the system according to the present invention are the Television Identification System (TVID) and Code and Visual Entry Authorization Technique (CAVEAT) System, both systems manufactured by Ampex Corporation, assignor of the present patent application.

The TVID System is described briefly in "Bulletin No. 1410-5", issued in July 1973 by the Ampex Corporation. This pamphlet does not provide sufficient information to enable a person having an average skill in the art to reduce the presently disclosed and claimed invention to practice.

A manual related to the CAVEAT System entitled "Operating Instructions for the CAVEAT System" issued by Ampex Corporation in November 1974. It comprises instructions concerning installation, equipment and operation of the system directed to systems operating personnel. This manual does not provide a disclosure of the present invention in any manner.

Briefly, in the preferred embodiment of the invention, "history" pictures of personnel entitled to have access to certain restricted areas within a plant or installation, are recorded on a video disc. Each person is assigned a five digit random code number, which number is to be kept confidential. This code number is recorded in a particular segment of a look-up track preferably on the same disc. This look-up track segment is permanently associated in a sequential manner with the particular video segment, in which the history picture is recorded. Thus, the random code number represents an indirect address upon which that history picture can be retrieved.

Every time a person enrolled in the video disc file enters the protected area or exits therefrom he inserts his code number in an enter/exit keyboard. He also presses an ENTER-EXIT pushbutton which sets the system in the requested mode. At the same time, the person frames himself in front of a television camera and his picture appears on a live television monitor located e.g. in a remote Guard Station or at an Entry Control Point. In the meantime, the system compares the entered indirect address number with all the indirect addresses stored on the look-up track on the disc. If a match is found, the system retrieves the associated picture, verifies the gate authorization and transmits the picture retrieved from the history file to the remote Guard Station. If the live and history pictures indicate the same individual, the guard activates a corresponding enter/exit gate latch. If an invalid code number has been entered and no match has been found, or a valid code number has been entered by an unauthorized person, the system sends an alarm signal to the Guard Station and necessary action is taken.

In the preferred embodiment of the invention, up to seven enter/exit keyboards and a master keyboard are utilized.

For the purpose of illustrating the system for storing and retrieving video information of the present invention as an integral part of a computerized system for identification of authorized personnel, first a description of the system shown in the block diagram of FIG. 1 and its various modes of operation will be presented, followed by a detailed description of the operation of the encoder/decoder interface subsystem shown in FIGS. 6a to 6g.

Description of the Block Diagram of FIG. 1

Now, a block diagram of a preferred embodiment of the present invention shown in FIG. 1 will be described briefly.

A disc file subsystem 11 is utilized to record video information and digital data on a video disc 115, which will be described later in more detail. An erase, record and playback head 119 is associated with each, upper and lower recording surface of the disc, respectively. Record electronics 113 and playback electronics 111 both are connected to the respective heads 119 through a record/playback amplifier (RAPA) 114 in a conventional manner. An electronic switch 112 is employed to connect alternatively circuits 111 and 113 to RAPA 114, depending on the instant mode of operation of the disc file 11. The position of switch 112 is controlled by a computer 15. Stepper logic 118, stepper 117 and disc drive 116 are conventional devices associated with the disc 115 and are utilized for rapid head stepping, precise positioning and for a synchronous disc drive respectively in a conventional manner.

During enrolling, the video information is transmitted into the system via a conventional television camera 131 and it is "looped through" a titler 132 and a conventional live monitor 133. The camera 131 is utilized to transmit a picture of an individual to be enrolled in the disc file. A suitable camera is TIE-15E manufactured by HITACHI, Ltd. As a live monitor 133, model SNA-14C manufactured by CONRAC can be utilized. The titler 132 is utilized to enter alphanumeric information in video format to be recorded within the video signal. Information such as rank, gate number, name, date, time, etc. may be stored within the picture and displayed therewith for identification. A suitable titler is D-1500 Datavision Character Generator. This device has a display capacity of 32 characters by 15 rows for a total of 480 characters. Only 2 rows of alphanumeric recording are utilized in the present system, at the bottom of the TV raster.

A video switcher 10 is utilized to provide both video and digital signal paths throughout the system responsive to control signals from a micro-computer 15, as will be disclosed in more detail in connection with the description of various modes of operation of the system. The video switcher 10 comprises operational amplifiers 101, through 103.

A conventional video tape recorder (VTR) 14 is connected to the video switcher 10. It constitutes a back-up file for the video disc 115 and enables transfer of the video fields from the disc file 11 to a tape. A suitable VTR is VP 5800 manufactured by Ampex Corporation. Periodically, depending upon enrolling activity, the contents of the entire disc file are transferred to the VTR via the video switcher 10. In case, the pictures on the disc file are accidently erased, the back-up file on the tape is used to restore the video information on the disc file.

A conventional monitor serves as a history monitor 135 to display video information retrieved from the disc 115. A history monitor 135 is placed at every Guard Station.

A field grabber 16 is associated with each history monitor. It is a standard disc recorder rotating at 3600 RPM and utilizing one fixed erase, record and playback head, per channel. In FIG. 1 a dual field grabber is shown, associated with two history monitors. As an example, FG-3600 Field Grabber, manufactured by Ampex Corporation could be utilized. Each fixed head (not shown) records on and reproduces from a single track representing one television field information comprising 254 or 256 horizontal lines. The field grabber 16 is utilized as a buffer on which a television field retrieved from the disc 115 is recorded and played back periodically at a scan rate of 60 interlaced fields per second. This field is then continuosly displayed on the above-mentioned history monitor 135 until cleared. As shown in FIG. 1, the video information to be displayed on the history monitor 135 is routed from the playback electronics 111 of disc file 11, through the operational amplifiers 101 and 102 and a video switcher 125 of an encoder/decoder interface subsystem 12 into the field grabber 16 and therefrom into the history monitor 135. More than one field grabber 16 can be utilized in the system, each associated with one or two distinct history monitors and connected thereto e.g. via a coaxial cable or via a conventional microwave transmitter 149. The transfer of picture information from the field grabber 16 to the history monitor 135 is controlled by the computer 15.

A microcomputer 15 is employed to control the transfer of video information and data throughout the system in various modes of operation. The microcomputer may be implemented by a conventional central processing unit (CPU) in combination with standard devices, connected to CPU in a known manner, such as an input/output port expander, input/output device switcher, read only memory (ROM), a random access memory (RAM/ROM) expansion unit, etc. A suitable central processing unit (CPU) is INTELLEC 8 manufactured by INTEL Corporation. The program instructions for the CPU may be stored in a core memory or ROM. The program controller of the CPU examines one by one the instructions stored in the ROM, interprets each instruction and causes the various circuits to be activated to perform the specified functions. A suitable ROM device is a 256 byte module No. C1702A manufactured by INTEL Corporation. A suitable RAM (random access memory) unit is C2102 manufactured by INTEL Corporation. Both memory units may be interconnected with the CPU via an input/output (I/0) port expander in a conventional manner. A suitable I/O port expander is IMM 8-60 manufactured by INTEL Corporation. An Asynchronous Receiver/Transmitter TR 1402A or TR 1602A manufactured by Western Digital Corporation may be also utilized.

A mode selector associated with the CPU is utilized to select the following modes of the computer operation: keyboard operation (inputs from the master keyboard or enter/exit keyboards); disc-to-tape transfer; tape-to-disc transfer; and restore look-up track. The mode selector enables to select the desired mode by activating a corresponding computer program via pushbuttons.

To simplify the description of the preferred embodiment, the above-mentioned associated conventional devices are shown in FIG. 1 as an integral block representing the computer 15. Control signals from/to the computer to/from the various elements of the system are indicated by double lines with arrows.

A master keyboard 134 is connected to the computer 15. The master keyboard 134 is a manual system input and control device which has a 9-digit keyboard to enter data into the system. It also has pushbuttons and switches to indicate special operation modes and to transmit input/output requests to the computer. Control lights indicate the instant mode of operation of the system and provide various warning and control signals transmitted by the computer to the operator. The master keyboard has a digital readout display. The role of the master keyboard 134 as an input device for the system will become more apparent in a following description of the system operation. To the computer 15 a modulator/demodulator (MODEM) unit 145 is connected. It enables transmission of digital data over telephone lines of rather long distances from enter/exit keyboards 53 to the computer 15 and vice versa. A teletypewriter 147 may also be connected to the computer 15 for automatic logging of enter/exit activity. The logging may be punched on paper tape and typed on roll paper (not shown). A number of modems and enter/exit keyboards (only one of each shown) may be utilized in the system to transmit data (e.g. 5-digit code numbers) to/from distant gates from/to the computer 15. Suitable keyboards are DK-1 and DK-2 made by Ampex Corporation.

A reference sync and clock generator 333 is utilized to generate a video synchronizing signal (reference sync) for the system operation and clock pulses for the disc stepper control (240 steps/sec., i.e., 4 msec stepper) as utilized in several video systems manufactured by Ampex Corporation. This generator also produces a CIT clock pulse which has a frequency of the disc revolutions and which is utilized as a reference clock pulse for the encoder/decoder interface subsystem 12, as it will be described later.

To convert the high speed serial digital data to be recorded on or retrieved from the look-up track of the disc 115 to low speed parallel data adapted for processing by the computer 15, an encoder/decoder interface subsystem 12 has been designed. This subsystem comprises a timing circuit producing an internal reference clock pulse, derived from and synchronized with the rotation of the disc. This subsystem 12 also includes a periodical look-up track segment counter which indicates the instant position of these segments with respect to an initial position of the rotating disc. The subsystem 12 also inserts data bits into the horizontal blanking periods of the horizontal lines within the video field prior to recording of the video information on the disc and extracts these bits from the reproduced video information. It provides for comparison of up to eight indirect address (random code number) requests during one revolution of the disc with the indirect addresses stored on the look-up track.

Prior to describing the encoder/decoder subsystem in more detail a detailed description of the disc 115 is presented.

Disc Format

The disc utilized in the preferred embodiment is preferably of the type utilized e.g. in the DF-1000 video disc file series manufactured by Ampex Corporation, assignor of the present patent application. The preferred disc size is 16¼ inch in diameter and a quarter of an inch thick. The disc file incorporates flying heads and a clean-air head-disc environment for maximum reliability. The head flies a few micro-inches above the disc surface. A single crystal ferrite type head with a single gap is used for erase, record and playback operations. The number 1000 in the disc file model number refers to the storage capacity in frames. The disc in DF-1000 rotates at 1800 RPM corresponding to the standard video picture rate of 30 frames per second. In the DF-1000 video disc file one full frame is recorded on each track of the disc.

In the preferred embodiment of the present invention, four fields of independent video picture information are recorded on one full track of the disc, each field having 254 or 256 horizontal lines. By this arrangement the storage capacity of the disc is quadrupled. Now 4000 television fields could be recorded on the disc 115, each field having one half of vertical resolution. To enable such an increase in the density of recording video pictures on the disc, the disc speed is reduced to 900 RPM in the preferred embodiment. The latter arrangement results in a reduced disc-to-head speed by one-half and thereby in a reduced bandwidth of the recorded signal. Thus, the reduced horizontal resolution matches the reduced vertical resolution of the recorded video information. It is to be noted that despite the reduced resolution of the recorded video information, the pictures are of sufficient quality for identification purposes, as will be disclosed later. On the other hand, a highly economical high density and high speed video storage and retrieval system is obtained. With respect to the increased storage capacity of the disc to 4000 video fields, the disc file utilized in the preferred embodiment of the invention will be designated DF-4000.

As an alternative, 2 frames of a video picture information may be recorded on a full video track of the disc, at a 900 RPM disc rotation rate. In this case, each frame would have 525 horizontal lines.

Still alternatively, one frame of video picture information per track at 1800 RPM of the disc rotation may be recorded. Each frame would have 525 horizontal lines. In these alternative cases the segmenting of the look-up track would be changed accordingly.

The data format of both video information and digital data stored on the disc 115 will be now described in more detail. FIGS. 3a and 3b show the upper side 0 and lower side 1 of the disc, respectively. Both sides of the disc are divided into four quadrants, respectively. These quadrants are numbered consecutively 0 to 3 on each respective side of the disc in a direction opposite to the disc rotation. The utilized 16¼ inch disc has 500 circular tracks per surface, that is, 1000 tracks on both sides. These tracks are numbered by consecutive numbers from the outside inwardly towards the center of the disc by numbers 0 to 999. The outermost track of each side of the disc 115 represents the previously mentioned look-up track utilized as an indirect address memory. Each look-up track is segmented into 2100 consecutively numbered segments of which only 2000 segments are utilized for data recording. At a rotation speed of 900 RPM of the disc each segment of the look-up track has a duration of one-half horizontal line interval of the video raster.

It has been previously mentioned that one picture information is stored on each track-quadrant of the disc. The individual track-quadrants represent video track segments. They are numbered consecutively, in the direction opposite to the disc rotation, by four-digit decimal numbers. These four-digit numbers from direct addresses of the recorded video information. The first four four-digit numbers 0000 to 0003 designating quad 0 to quad 3 of look-up track 0 on side 0 and numbers 2000 to 2003 designating quad 0 to quad 3 of look-up track 500 on side 1 are not utilzied as direct addresses. Thus, the first direct address 0004 designates track 1, quad 0 on side 0, followed by 0005 for quad 1, track 1, etc. The last direct address on side 0 is 1999, corresponding to quad 3, track 499. Analogously, the first direct address on side 1 is 2004 assigned to track 501, quad 0, followed by 2005 for track 501, quad 1, etc. The last direct address on side 1 is 3999 assigned to track 999, quad 3. FIG. 3a and 3b show the above-described direct addresses of the disc format.

Now, the look-up track format will be disclosed in more detail. As above described, the look-up track 0 on side 0 and 500 on side 1 respectively, are segmented each into 2100 segments, each segment corresponding to one-half horizontal line interval. These segments are numbered by four-digit numbers consecutively in the direction opposite to the rotation of the disc. The numbers assigned to these look-up track segments are the same as the above-described direct address numbers assigned to the corresponding video track segments. Thus, look-up track 0 has assigned numbers 0000 to 1999, of which 0000 to 0003, corresponding to the look-up track quadrants, are not utilized as direct addresses. The beginning of look-up segment 0000 on side 0 indicates the initial (reference) position of the rotating disc. On side 1, look-up track 500 is segmented into segments numbered 2000 to 3999 of which segments 2000 to 2003, corresponding to the look-up track-quadrants, are not utilized as direct addresses. Thus, look-up track segments 0004 to 1999 on side 0 and 2004 to 3999 on side 1 correspond to the above-described video track segments of each respective side and form the direct addresses thereof.

Attention is now directed to FIG. 4 showing the data format of the look-up track segments. In each look-up track segment an 80-bit digital word maybe recorded in binary form and stored. This recorded data is related to a particular field of video information stored on the same side of the disc on a video track segment corresponding to that particular look-up track segment. As described above FIG. 4 shows an example of an 80-bit data format utilized in the preferred embodiment for recording on the look-up track. The duration of the 80-bit word is 31.746 $\mu$ sec which time corresponds to one half horizontal line interval of a standard television raster. The 80 bits are designated by consecutive numbers 0 to 79, each bit has a duration of 396.8 nanosec. Following bit 6, the word contains an Indirect Address No. 1 which may have up to 36 bits. However, in the preferred embodiment of the invention only 20 bits are utilized. Bits 43 to 45 form a gap between Indirect Address No. 1 and Indirect Address No. 2. Indirect Address No. 2 starts at bit 46 and contains up to 20 bits. Bits 66 and 67 form a gap between Indirect Address No. 2 and the following data which is a picture/no picture bit on bit 68. Its function in the word will be explained later. Bits 69 to 79 are not utilized for data recording.

The Indirect Address No. 1 comprises a 5 digit decimal random number in binary form. This number could be eventually extended up to 9 digits. As it has been previously mentioned, a distinct 5-digit number is assigned to each individual enrolled in the file and is generated by a conventional random number code generator (not shown). The Indirect Address No. 2 could be e.g. an employee number of the same individual also in binary form or any other distinct (random) number.

From the previous disclosure follows that each field of video information recorded on a distinct video track segment of the video disc 115 has assigned a Direct Address (segment number), an Indirect Address No. 1 and may have assigned an Indirect Address No. 2. Consequently. each recorded field may be located in the video file by either of these mutually independent addresses. This is an important feature of the present invention since e.g. the Indirect Address No. 1 of the preferred embodiment may be known and used only by the person to which it has been assigned while Indirect Address No. 2 or the direct address may be known e.g. to the operator and used whenever necessary.

It is to be noted that in the preferred embodiment of the invention the Indirect Address No. 2 is not utilized. However, the above-mentioned twenty bits are reserved, therefore, in the 80-bit word for an application where both Indirect Addresses are utilized. For the purpose of the disclosure, reference to this effect will be made throughout the specification where appropropriate.

Description of the Block Diagram of the Encoder/Decoder Interface Subsystem.

The block diagram of the encoder/decoder interface subsystem 12 shown in FIG. 1 will be described now. A tach and clock generator 200 receives a HI TACH signal derived from the rotation of the disc. Generator 200 drives a BCD segment counter 222 and an 80-bit counter 212. Counter 222 has a periodical output signal indicating look-up track segment numbers of the rotating disc with reference to an initial position of the disc. The 80-bit counter indicates bit counts 0 to 79. An 80-bit time interval corresponds to a horizontal half-line period and at the same time to the length of one look-up track segment. A look-up write comparator 124 compares the output of the counter 222 with look-up segment numbers supplied by the computer 15. A horizontal line decoder 500 driven by the BCD segment counter 222 is preset to indicate the selected horizontal line count on which lines the data in video is to be recorded. This count is supplied to respective circuits 125, 674 and 806 coupled to insert/extract, data bits in/from the video signal, respectively.

A look-up read comparator 126 comparing a circulating register 424 and a comparator 440 is coupled to compare indirect address request data supplied by the computer 15 with data on line SB. Line SB supplies data reproduced from the look-up track by playback electronics 111, via video switcher 10, video switcher 125 and sync and video stripper circuit 127. The data supplied by the computer is circulating in the 80-bit circulating register 424 from which it is fed to the comparator 440 at a 2.54 MHz serial bit rate. The beginning of each 80-bit word in the circulating register is in synchronism with the beginning of a look-up segment. If a match is found in the comparator 440, a gate 120 is enabled and generates an HE (hit enable) pulse. This pulse is fed to a look-up decoder circuit 291 which generates an IS (input strobe) pulse and supplies it to a FIFO No. 1 asynchronous register 472. Depending on the exact position of the occurrence of the HE pulse within the 80-bit interval, the circuit 291 generates either four or three or two strobe pulses which are then applied via line IS into the register 472. These strobe pulses on line IS indicate an Indirect Address No. 1 and No. 2 match or only an Indirect Address No. 2 match or locating a FES (first empty segment) on the look-up track, respectively. Upon receiving an IS signal, the register 472 reads in the instant segment number supplied by the BCD segment counter 222 and transmits it back to the computer 15.

The output signal WLUEN from the write comparator 124 is a write look-up enable signal and it is fed into the record electronics 113. The look-up data WLU to be recorded on the look-up track from the circulating register 424 is fed into the video switcher 125.

Via video switcher 10, the video switcher 125 receives either video signal from the camera 131 via live monitor 133 or video signal with data inserted therein reproduced from the disc 115 or data reproduced from the look-up track. From circulating register 424 the video switcher 125 receives an 80-bit data word to be recorded on the look-up track. From a parallel-to-serial buffer 692 via line DW the video switcher 125 receives data to be recorded bit-by-bit in the video signal. The output of the video switcher 125 is fed via line VAD (video and data) and field grabber 16 (loop-through) to the record electronics 113 when the signal is to be recorded on the disc 115. The reproduced signal from the disc is fed from the playback electronics 111 via video switchers 10 and 125 to the sync and video stripper 127. The look-up data is recorded on the disc when the record electronics receives a look-up write enable signal (WLUEN) from comparator 124.

The data on line SB which is either reproduced from the look-up track or extracted from the video signal, respectively, is supplied via sync and video stripper circuit 127 to a serial-to-parallel buffer 575. The data from the video is transferred via a FIFO No. 2 asynchronous register 674 to a parallel-to-serial buffer 692 and from there via line DR to a majority word comparator 806. Since each data word is recorded in the video signal three times for redundancy as it will be described in detail later, the majority word comparator provides a majority word data output and feeds it back to the computer 15.

The computer 15 transmits and receives control signals to and form various elements of the system at various times, in accordance with the computer program. These control signals are designated by double lines with arrows indicating the direction of the signal transfer.

Now, with reference to the block diagram of FIG. 1, various modes of operation of the system will be described.

Enrolling Mode

To enroll an authorized person into the file, the operator first enters "title data" to be recorded in video form with that person's picture, utilizing the titler 132. The title data may comprise name, rank, social security number, authorized gate (area) numbers. etc. This data appears on the live monitor 133 in the lower portion of the picture and may be recorded on the disc together with the picture. On the master keyboard 134 the operator moves an ENROLL/DISENROLL switch in ENROLL position. Pushbuttons on the master keyboard 134 are not showing in the drawing. Operator presses area authorization pushbutton and enters a 5-digit area authorization number on the master keyboard, where it is displayed. The person to be enrolled receives a 5-digit random code number from a conventional random number generator (not shown). This number should be known only to the authorized person and used each time this person enters or exits through a gate. Now, the operator presses CODE pushbutton on the master keyboard 134 and the person to be enrolled enters his code number on the master keyboard. This code number is utilized as an Indirect Address No. 1. The Indirect Address No. 1 and the area authorization number are transferred from the keyboard 134 into the memory of the computer 15. The computer forms an 80-bit data format comprising Indirect Address No. 1 as shown in FIG. 4 (with the exception of the picture/no picture bit which will be inserted later) and transfers it into a circulating register 424 where this data circulates at a 2.54 MHz bit rate until cleared. This Indirect Address No. 1 (code number) is compared in the look-up read comparator 440 bit by bit with all the Indirect Addresses No. 1 stored on the look-up track which are fed into the comparator 440 via line SB. In case a match is found, it is sensed by gate 120 and a control signal is fed into the look-up read decoder 291. The look-up read decoder 291 generates 4 strobe pulses and transmits them via line IS to the FIFO No. 1 asynchronous register 472 and this register reads in the four digit look-up segment number (direct address) transmitted by the BCD segment counter 222 and stores it until transmitted therefrom to the computer 15. The computer sends a control signal back to the master keyboard 134 which lights a NUMBER UNAVAILABLE indicator. The process has to be repeated with a new Indirect Address No. 1 number until no match is found in comparator 440.

In case no match in look-up read comparator 440 is found, the look-up read decoder 291 locates a first empty segment (FES) on the look-up track and sends 2 strobe pulses via line IS to the FIFO No. 1 register 472. This register reads in the instant four digit look-up segment number from the BCD segment counter 222, corresponding to that FES and transmits it to the computer 15. The computer transmits the four digit video track segment number corresponding to that FES to the master keyboard for display.

The person to be enrolled "frames himself" in front of the camera 131 and is viewed simultaneously in the live monitor 133. The operator presses a RECORD pushbutton on the master keyboard 134. The control signal from 134 is transferred to the computer 15 and therefrom to the switch 112 and record electronics 113.

The video signal from the live monitor 133 is fed via video switcher 10 into the video switcher 125. Simultaneously, the computer 15 compiles an 80-bit word comprising data (segment number, Indirect Address No. 1, area authorization number, picture bit) to be recorded bit-by-bit on the back porch of respective horizontal sync signals of selected horizontal lines. This data fed in parallel form from the computer 15, via the FIFO No. 2 asynchronous register 674 to the parallel-to-serial buffer 692 and, therefrom, in serial form via line DW into the video switcher 125. In the video switcher 125 the data to record in video is added to subsequent horizontal lines of the video field transmitted from the live monitor 133 three times for redundancy, as will be described later in more detail. The horizontal line decoder 500 driven by the counter 222 supplies a selected H-line count derived from the rotation of the disc to the video switcher 125, FIFO No. 2 asynchronous register 674, and majority word comparator 806, respectively. From switcher 125 the video and added data is fed via line VAD into the record electronics 113 and via switch 112, RAPA 114 to the transducers 119. The stepper 117 controlled by the stepper logic 118 which is in turn controlled by the computer 15, is stepped to the corresponding video track segment, and the signal on line VAD is recorded thereon.

The operator terminates the Enroll procedure by pressing a CLEAR KEYBOARD pushbutton on 134. Subsequently, the computer 15 sends the FES number to the look-up write comparator 124. When a match with the output of the BCD segment counter is indicated, the output of comparator 124 produces a write enable pulse WLUEN. The video switcher 125 receives the data to be recorded on the look-up track from the circulating register 424. This look-up data contains Indirect Address No. 1 (code number) and also a picture bit inserted therein by the computer upon recording the video signal on the corresponding video track. This data is transmitted from the video switcher 125 via line VAD to the record electronics and recorded on the look-up track, upon receiving the WLUEN control signal.

Following the recording process, the playback electronics, controlled by the computer 15, transmits the recorded video signal to the history monitor for display. The video signal reproduced from the disc if fed via respective video switchers 10 and 125 and field grabber 16 to the history monitor 135. It is understood that the data recorded bit-by-bit in the video signal does not show on the history monitor since that recording takes place in the horizontal blanking interval.

Picture Retrieval by Direct Address Mode

The operator can retrieve a recorded picture any time by pressing a TRACK NUMBER pushbutton and inserting a corresponding four digit video track segment number (direct address) into the master keyboard 134, which transfers it to the computer 15. The computer transfers a corresponding control signal to switch 112, playback electronics 111 and the stepper logic 118. The stepper 117 moves the heads to that track segment and the video signal is then played back via the same path as described before and displayed on the history monitor 135.

DISENROLLING (removing from the file) MODE

The operator moves the ENROLL/DISENROLL switch in the DISENROLL position and presses TRACK NUMBER pushbutton on the master keyboard 134. The operator enters a four digit video track segment number and the following process is analogous to that described under "Picture retrieval by direct address mode". The operator compares the numerical readout on the master keyboard 134 display with his track number log. If numbers do not agree, he presses a CLEAR pushbutton and repeats the operation. When the track numbers agree, the operator presses a DELETE pushbutton. The video information on that corresponding video track segment is then erased along with the data in video and this operation is followed by erasing the corresponding look-up track segment. These latter operations are controlled by the computer 15 in accordance with the computer program.

Enter/Exit Mode

Now, the operation of the system shown in FIG. 1 with respect to the ENTER/EXIT mode will be described.

A person to enter or exit through a gate frames himself in front of a standard television camera (not shown) and enters his 5-digit Indirect Address No. 1 code number into an ENTER/EXIT keyboard 53 located at that entrance/exit gate. This number is transmitted to the computer 15 and from there to the circulating register 424. This entered data is compared with the data reproduced from the look-up track and fed via line SB in the look-up read comparator 440. When no match is found, the computer transmits an ALARM signal to the guard. An appropriate security action may be taken by the guard.

If a match is found in the look-up read comparator 440, the look-up read decoder 291 sends four strobe pulses via line IS into the FIFO No. 1 register 472. The register 472 reads in the corresponding look-up segment number from the BCD segment counter 222 transfers it to the computer 15. The computer 15 controls the stepper 17 indirectly via the stepper logic 118 to move the transducers 119 adjacent to the corresponding video track segment. The video information is played back via the heads 119, RAPA 114, switch 112, playback electronics 111, video switchers 10 and 125, field grabber 16, microwave transmitter 149, a microwave receiver (not shown) and a history monitor 135, located at a remote guard station for display. The guard compares the pictures on the remote live (not shown) and history monitors and if they correspond, he activates the corresponding gate latch.

In the Enter/Exit mode, the gate authorization number extracted from the data in the video signal, as it will be described later, is compared in the computer 15 with the corresponding gate location from which the enter/exit request is made. If no match is found, the computer sends an ALARM signal to the remote guard station and the history picture is not transferred.

Restore Look-Up Track Mode

When the look-up track on the disc 115 has been accidentally erased, it can be restored from the data in the video picture file recorded on the disc as follows.

As previously mentioned, an 80-bit data word, compiled by the computer 15 is recorded bit-by-bit in the respective horizontal blanking intervals of selected horizontal lines of the video information signal. This word is recorded three times for redundancy on consecutive horizontal lines of a video field on the disc.

Upon actuating a corresponding pushbutton on the mode selector (not shown) of the computer 15 the system sets into the "restore look-up track" mode. The transducer 119, stepper logic 118, switch 12 and playback electronics 111 are activated by the computer 15, and the video signal with the data recorded therein is reproduced form the disc. It is fed via video switchers 10 and 125 to sync and video stripper circuit 125, where the composite sync and video signal are stripped off the data. The data is fed from circuit 127 into the serial-to-parallel buffer 575 and via the FIFO No. 2 register 674 and parallel-to-serial buffer 692 via line DR to the majority word comparator 806. The majority data word is fed from 806 to the computer 15. In the computer, the Indirect Address No. 1 and the picture/no picture bit are extracted from the majority data, ad the look-up data is compiled to have a format shown in FIG. 4. The look-up data is then fed from the computer into the circulating register 424. The corresponding look-up segment number on which the look-up data is to be recorded is supplied by the computer to the look-up write comparator 124, and the following process of recording on the look-up track is analogous to that described in the Enrolling Mode.

It is to be noted, that every time and in any mode of the system operation when the video signal is retrieved from the disc, the data is extracted therefrom in the above-described manner. This data may comprise, e.g., the video (look-up) segment number, authorized gate number, picture/no picture bit, Indirect Address No. 1 and No. 2, etc. This data from video is fed to the compute via the above-described path. The computer compares the segment number, gate number and picture/no picture bit, respectively with the corresponding data stored in the computer memory. A backward-forward counter in the computer 15 compares the number of steps actually performed by the transducer stepper 117 with the number of steps requested for positioning the transducer and checks the corresponding segment number with the data extracted from the video signal.

Disc-to-Tape and Tape-to-Disc Modes

The contents of the video segments recorded on the disc 115 are transferred periodically to the video tape recorder (VTR) 14. The operator presses a corresponding pushbutton on the mode selector of the computer 15 and the computer activates the switch 112, playback electronics 111, video switcher 10 and VTR 14. The picture information from the disc is then transferred to a video tape for storage.

When the picture information is to be restored on the disc, the information from the tape is played back from the VTR 14 and fed via the video switcher 10, video switcher 125, field grabber 16, record electronics 113, switch 112, RAPA 114 and transducers 119 and it is recorded on the disc.

In case the look-up track has to be restored, too, this may be done by the previously described Restore Look-Up Track Mode. Since the digital data word in the video is recorded three times repeatedly for redundancy and the majority word from the majority word comparator 806 is utilized to restore the look-up data, errors in the data inherent in the recording and reproduction process, e.g. caused by drop-outs of the video tape, etc. are minimized.

Detailed Description of the Encoder/Decoder Interface Subsystem.

Figure 7:
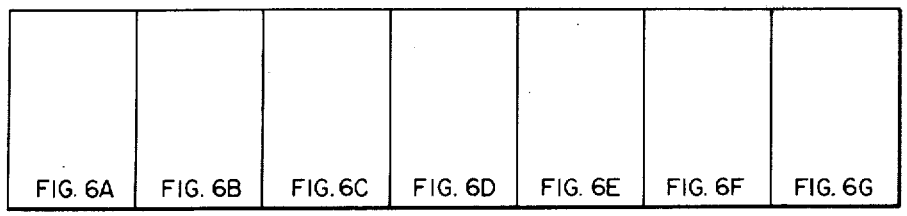
FIG. 7 is a block diagram showing how

A detailed diagram of the encoder/decoder interface subsystem 12, shown in FIGS. 6a to 6g will be described now. FIG. 7 shows how FIGS. 6a to 6g are arranged to form a complete diagram of that subsystem.

The encoder-decoder subsystem 12 utilizes standard integrated circuit elements. In order to facilitate the understanding of the description, a list of standard elements suitable for use in the encoder-decoder subsystem is given in TAB. 1, including the product number and manufacturer, respectively. This list is enclosed merely for illustrative purposes and it does not constitute a limitation of the invention in any manner. TAB. 1 can be found at the end of the specification, preceding the claims.

In the following description it is assumed that both a 5-digit Indirect Address No. 1 and a 5-digit Indirect Address No. 2 are recorded on the look-up track of the disc utilizing an 80-bit word format shown in FIG. 4.

Figure 5:
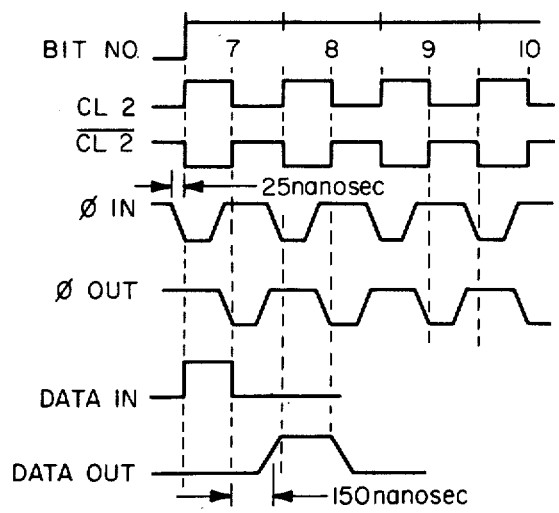
FIG. 5 is a timing diagram of the various clocking signals utilized in the system.

On FIG. 6a an internal tach and clock generator 200 is shown. The clock generator 200 of the preferred embodiment derives its frequency from a disc rotating at 900 RPM, instead of a standard 1800 RPM or 3600 RPM. Consequently, the frequency of low tach singal of the present system is 15 Hz. The frequency of the high tach signal is 2625 × 2 × 15 Hz, which equals 78.75 KHz. Both high and low tach signal frequencies are derived from the disc rotation in a well known manner described e.g. in the AMPEX MANUAL "DR 10 Video Disc Recorder and Reproducer" No. 1809027, issued August 1970, chapters 4-8 on page 4-2 to chapters 4-23 on page 4-10. In the clock generator 200 a voltage controlled oscillator (VCO) circuit 202 having a built-in phase locked loop is utilized, having a center frequency of 5.04 MHz. The high tach input signal of 78.75 KHz passes through a low pass filter 204 and into the input of the VCO circuit 202. The output of the VCO circuit is fed through a line receiver 206, to increase the voltage to a level necessary to drive a J-K flip-flop 208 which is coupled to the output of the line receiver 206. This flip-flop 208 operates as a frequency divider by two. The 5.04 MHz signal at the output of the line receiver 206 is fed into the clock input of the J-K flip-flop 208. An output frequency of 2.54 MHz is obtained at output 1 of the flip-flop 208. It is fed through a line receiver 296a and designated $\overline{CL2}$. A complementary output signal of the same frequency but 180° out of phase therewith is obtained at output 2 of flip-flop 208. This latter signal is fed through a line receiver 296b and designated CL2. Signals CL2 and $\overline{CL2}$ are the 2.54 MHz complimentary master clock signals for the encoder/decoder subsystem 12. FIG. 5 shows timing diagrams of the main clock signals utilized in the encoder/decoder interface subsystem 12.

The 2.54 MHz signal is fed into an 80-state counter 212 which comprises two frequency dividers 214 and 216. The divider 214 divides the 2.54 MHz frequency by 15, whereas the divider 216 divides the output signal frequency of the divider 214 by 5. A 157 KHz output signal from the divider 214 is fed via an inverter 218, into a clock input of a J-K flip-flop 220 which is utilized as a freqency divider by two. The output signal of 78.75 KHz of the flip-flop 220 is fed into a second input of the VCO circuit 202 as a feedback signal.

A 31.5 KHz output signal from the divider 216 forms the half-line horizontal sync signal HS/2 which is utilized as an internal horizontal sync interval throughout the system as will become apparent from the following description.

The counter 214 of the 80-state counter 212 is a low order counter, counter 216 is a high order counter. The outputs of counter 214 are designated Q10 to Q13, the outputs of counter 216 are designated Q20 to Q23. In order to facilitate the understanding of the following description, the respective counts at these outputs are shown in TAB. 2 enclosed at the end of the specification, following TAB. 1.

A look-up segment counter 222 shown in FIG. 6a comprises BCD counters 224, 226 and 228. These counters are driven by the HS/2 pulse from the output of the 80-state counter 212 through a NAND gate 230. Thus, these counters are in synchronism with the rotation of the disc. Each counter has four outputs, each output representing a distinct order of units, tens and hundreds, respectively, in binary count. The outputs A3 through D3 from counter 224 represent units, the outputs A4 through D4 from counter 226 represent tens and outputs A5 through D5 represent hundreds of the BCD count.

The counter 222 also comprises comparators 232, 234 and 236 which are combined to be preset to an alternative BCD count of 524 or 526. The preset count is altered at every maximum count 524 or 526, respectively by utilizing flip-flops 238 and 240. The flip-flops are reset at every incoming CIT pulse. The CIT pulse is supplied by a reference sync and clock generator 333 which is shown in FIG. 1. The CIT pulse represents four vertical sync intervals in accordance with the NTSC standards, and it is derived from a standard crystal oscillator (not shown). The CIT pulse has a frequency equal to the disc revolutions. Pulse CIT is fed through a NAND gate 241 and a latch 248 to the flip-flops 238 and 240. These flip-flops are interconnected in such a way that the output of the comparators 232, 234 and 236 on line 237 sets the flip-flop 238 high (logical 1) at the first preset count which is 524. The interconnected inputs of the flip-flop 240 are also high but at the absence of a clock pulse the output of flip-flop 240 stays low (logical zero). Thus, the signal on line A6 is 1, on line B6 is 0. This state corresponds to quad 1 portion of disc 115, (see FIG. 3a). The same high output pulse on line A6 presets the comparator 232 (lowest order comparator) to count 526. When this count is reached an output signal on line 237 sets flip-flop 238 low and flip-flop 240 high. The signal on line A6 is now 0 and on line B6 is 1. This state corresponds to quad 2 portion of disc 115. The same output signal 0 from flip-flop 238 resets comparator now to count 524. Upon obtaining this count, the signal on line 237 changes the state of flip-flop 238 to high but 240 stays high. The state on line A6 is 1 and on B6 is 1. This corresponds to quad 3 of disc 115. The output signal of flip-flop 238 presets comparator 232 to count 526. At next vertical sync pulse CIT both flip-flops are reset to low outputs. The state on lines A6 and B6 is now 00 and corresponds to quad 0. The count of counter 232 has been again reset to 524 and the cycle repeats.

By the above-described circuit a simplified method of establishing an even number of look-up segments for each disc quadrant is implemented. Instead of counting 525 horizontal half-lines for each quadrant, counting 524 for the even numbered quadrants 0 and 2, respectively, and 526 for the odd numbered quadrants 1 and 3, respectively is provided. The information representing side 0 or 1, respectively of disc 115 is derived from pulse REV via a NAND gate 243 and flip-flop 244. Thus, the output signal DS (disc side) of flip-flop 244 on line A7 is 0 for disc side 0 and 1 for disc side 1.

From the previous description it follows that output of the look-up segment counter 222 on lines A3 to D3, A4 to D4 and A5 to D5 constitutes a periodical count of the position of the disc in H/2 intervals. This count comprises information of the instant segment number on the look-up track from 0 to 524 for quadrant 0 and 2, respectively and from 0 to 526 for quadrant 1, and 3 respectively. Quadrant number 0 to 3 is presented on lines A6, B6 and disc side number 0 or 1 on line A7. This count provides a continuous periodical information of the exact position of the rotating disc with respect to an initial reference position.

It has been previously explained that in this particular embodiment of the invention each segment of the look-up track corresponds to a picture information stored on one quadrant of a video track on disc 115. Therefore, the above count corresponds in every instant to a direct address of a distinct picture information recorded on the disc.

In the following description, the look-up write comparator circuit 124 shown in FIG. 6c will be presented. The information on lines A3 to D3, A4 to D4, A5 to D5, A6, B6 and A7 is fed into one set of respective inputs of comparators 246, 248, 250 and 252, respectively. Into another set of inputs of comparator 246 lines D45 to D48, of comparator 248 lines D40 to D43, of comparator 250 lines D34 to D37 and of comparator 253 lines D30 to D32 from the computer 15 (FIG. 1) are fed. These lines supply a specific track, quadrant and disc side number designating a specific look-up segment location on which new data is to be recorded. Each comparator compares 4 pairs of inputs simultaneously. The outputs of all comparators are connected to line 264. The output signal from the comparators on line 264 goes high when all the outputs from all the comparators are high, that means when a match is found. A signal $\overline{LU}$ from the computer 15 is fed into input D33 of the comparator 253. $\overline{LU}$ is a negative look-up enable signal which is low when the look-up track is enabled. The output signal from line 264 is fed via an inverter 266, a flip-flop 268 to the record electronics 113 shown in FIG. 1 as a look-up write enable control signal WLUEN. The flip-flop 268 has a clock signal $f$ (74-75) fed thereto to assume proper timing of the data to be written on the look-up track as will be explained later. Into one input of a NAND gate 269 signal $\overline{WLUEN}$ from flip-flop 268 is fed, whereas its other input receives the serial data WLU to be recorded on the look-up track from the look-up read comparator circuit 126 (FIG. 6d) as will be described later.

In the following, a circuit 287 (FIG. 6b) for confining Indirect Address No. 1 and No. 2 will be described in detail. First, reference is made to FIG. 4 showing the 80-bit data format of the data recorded in the look-up memory. Let us suppose that a 20-bit Indirect Address No. 1 and a 20-bit Indirect Address No. 2 constitute two subsequent parts of an 80-bit digital word. These two parts are separated from each other by bits 43 to 45 of the 80-bit word. It is understood that up to 36 bits may be utilized in Indirect Address No. 1.

Circuit 287 comprises comparators 288, 290, 292 and 294. Comparator 288 receives low order bits from the counter 214 via lines Q10 to Q13. Comparator 290 received high order bits from the counter 216, via lines Q20 to Q23. Both comparators 288 and 290 are interconnected and preset to form an output signal $f$ (66) at a count 66.

It is to be noted that in the following description a high output signal from any element which occurs at a specific count of the 80-state counter 212 will be designated by letter $f$ following that specific count in parentheses. Analogously, a low output signal will be designated by the same symbol with a bar over it. To simplify the description, the lines carrying these output signals will be designated by the same reference character as the signal itself.

Analogously, comparators 292 and 294 also receive low and high order counts from the counters 214 and 216, respectively. The comparators 292 and 294 are interconnected and combined to have an output signal $f$ (27). Consequently, the output signal $f$ (66) from comparators 288 and 290 corresponds to the end of the Indirect Address No. 2 (see in FIG. 4) and the output signal $f$ (27) from comparators 292 and 294 corresponds to the end of the Indirect Address No. 1. These respective signals are clocked in by a signal CL2D which is the CL2 signal delayed in a dual monostable multivibrator 274, 276 by approximately 170 nanoseconds (FIG. 6a). This delay is necessary to compensate for the delay caused by the processing of these pulses in counters 214 and 216 and comparators 288, 290, 292 and 294 with respect to the master clock pulse CL2. The clocking by the delayed signal CL2D takes place in NAND gates 300 and 298, respectively. Pulse CL2D is delayed to fall in the center portion of pulse $f$ (66) and $f$ (27), respectively.

Comparators 302 and 304 are preset and combined to form an output signal $f$ (7) and comparators 306 and 308 to form an output signal $f$ (46). Inverters 314, 316, 317, 318 and 320 are coupled in lines Q10, Q21, Q20, Q22 and Q13, respectively, to invert the signal on these lines.

It is to be noted that in the following description lines carrying inverted signals will be designated by the same reference character as the lines carrying corresponding positive signals with a bar over the character. Comparator 302 receives input signals from counters 214, 216 via lines Q11, Q12, Q20 and Q21. Comparator 304 receives input signals via lines $\overline{Q22}$, Q23, $\overline{Q10}$ and $\overline{Q13}$. The comparators 302 and 304 are preset and interconnected to form an output signal $f$ (7). Signals $f$ (7) and $\overline{f(27)}$ are fed into a NAND gate 310. To the output of gate 310 a first input of a latch 322 is connected. The other input of latch 322 is connected to the output $\overline{f}$ $\overline{(27)}$ of gate 298. At count, 7, when input $f$ (7) of gate 310 is high and input $\overline{f(27)}$ is also high, the output of gate 310 is low. The output of latch 322 designated $\overline{IA1}$ is set low. At count 27, when input $\overline{f(27)}$ becomes low, the output of gate 310 becomes high and latch 322 is reset to have a high output IA1. The output of latch 322 is fed into one input of a NAND gate 326.

The comparator 306 receives input signals from counters 214, 216 via lines $\overline{Q10}$, Q11, Q12 and Q13. Similarly, the comparator 308 receives input signals from counters 214, 216 via lines $\overline{Q20}$, Q22, Q23 and Q21. The comparators 306, 308 are preset and interconnected to form an output signal f (46). This latter signal is fed into one input of a NAND gate 312. The other input of gate 312 is connected to the output $\overline{f}$ $\overline{(66)}$ of gate 300. At f (46) the input $\overline{f(66)}$ of gate 312 is high. Consequently, the output of gate 312 is low. Latch 324 has one input connected to the output of gate 312 and the other input to the output $\overline{f(66)}$ of gate 300. At $f$ (46) the output IA2 of latch 324 is low. At count 66 the signal $\overline{f(66)}$ is low and it changes the output $\overline{IA2}$ of the latch 324 to become high. The NAND gate 326 is utilized to form a logical sum of the signals IA1 + IA2. The signal IA1 from the output of latch 322 and the signal $\overline{IA2}$ from the output of the latch 324 are fed into two separate inputs of gate 326, and the output of gate 326 is fed into the read look-up decoder circuit 291, as will be disclosed later.

From the above description it follows that signal $\overline{IA1}$ is low between pulses $f(7)$ and $f(27)$ and signal $\overline{IA2}$ is low between pulses $f(46)$ and $f(66)$. With reference to the diagram in FIG. 4, the duration of the signal IA1 corresponds to the duration of the 20-bit Indirect Address No. 1 and the duration of the signal IA2 to the duration of the 20-bit Indirect Address No. 2. Thus, the sum IA1 + IA2 at the output of the gate 326 constitutes a mask during which data bits can be read from or recorded on the look-up track, respectively.

In the following description a look-up read comparator circuit 126 shown in FIG. 6d will be described in detail. Two four-input eight-bit digital multiplexers 420, 422, are utilized to receive up to eight Indirect Address No. 1 and/or No. 2 request via input lines D50 to D57 from the computer 15 (only one line shown in FIG. 1 to simplify the block diagram). These addresses will be compared with the contents of the look-up track and an 8-input NAND gate 120, will be enabled if a match for any of the 8 inputs is found. In the following description, 5-digit (20-bit) Indirect Addresses No. 1 and a 5-digit Indirect Address No. 2 will be considered to enter via lines D50 to D57 in the circuit 126.

The respective Indirect Addresses Nos. 1 and 2 may enter into the system via the master keyboard 134, or an entrance/exit keyboard 53 via modem 145 (see FIG. 1) This date is transmitted into the computer 15 and stored therein. When the system is in the ENTER/EXIT mode, the computer complies the input data in a form of an 80-bit word shown in FIG. 4. This word is fed in serial form from the computer 15 via one of the lines D50 to D57 into one of the multiplexers 420, 422. The multiplexers expand each input into two outputs. One output is connected to an input of one associated circulating register 424, 426, 428, 430, 432, 434, 436 or 438, respectively. The second output of these multiplexers serves as a feedback input port connected to the output of that register. The entered data circulates through the respective registers at a rate of 2.54 MHz. The clock pulse is supplied to the respective circulating registers by a clock pulse divider comprising a monostable multivibrator 472 and two positive AND gates 474, 476. The multivibrator 472 receives a clock pulse of 5.08 MHz from the tach and clock generator 200 previously described and delays it by approximately 110 nanoseconds, in order to synchronize the 80-bit words in the circulating registers with those reproduced from the look-up track. To the output of multivibrator 472 one input of two positive AND gates 474, 476 respectively is connected. The second input of AND gate 474 receives the clock pulse CL2 whereas the second input of gate 476 receives the clock pulse $\overline{CL2}$. AS a result, the output signal of gate 476 is a 2.54 MHz signal, and the output signal of gate 474 is of the same frequency but 180° out of phase. These latter two signals are fed into a 2-phase clock driver 478 to provide signals $\phi$ IN, $\phi$ OUT which are 180° out of phase (see FIG. 5) and of a sufficient level necessary to drive all the circulating registers connected thereto.

The respective outputs of the circulating registers 424, 426, 428, 430, 432, 434, 436, 438 are coupled to the respective first inputs of eight EXCLUSIVE - OR gates utilized as digital comparators 440, 442, 444, 446, 448, 450, 452, 454. The respective second inputs of these comparators are connected in parallel to a line SB. Via this line SB the data played back from the look-up track are fed into these eight comparators simultaneously, in synchronism with the data supplied by the above-described circulating registers. These comparators compare simultaneously up to eight entrance/exit requests from the distant input devices serially, that is, bit by bit. If any one of the bits compared in any of the eight comparators does not match, an output pulse from the particular comparator is generated. To the respective outputs of the comparators 440, 442, 444, 446, 448 450, 452, 454 respective inputs of J-K flip-flops 456, 458, 460, 462, 464, 466, 468, 470 are connected. The respective outputs of these flip-flops are set low (reset) periodically by each HS/2 pulse from the ouput of a NOR-gate 418 in the look-up read decoder 291 (FIG. 6c) prior to IA1 signal from gate 326 and by eadh $f(45)$ from gate 418 prior to IA2 signal from gate 326. The input of an inverter 338 is connected to the output of a NAND gate 336. A multivibrator 280 (FIG. 6b) is employed to delay the clock pulse CL2 by 130 nanosec. The resulting delayed pulse CL4 is fed into a multivibrator 350 of circuit 291 (FIG. 6c) which circuit will be described later. Pulse CL4 is further delayed by 6 nanosec. in a multivibrator 282 (FIG. 6b). The resulting delayed pulse CL3 is fed into one input of gate 336. Into its other input the output IA1 + IA2 of the previously described gate 326 of circuit 287 (FIG. 6b) is fed. The above-described delay of the clock signal CL2 is necessary to obtain a clock in the center of the data bits which are to be clocked-in into the J-K flip-flops. The respective outputs of the eight flip-flops 456 to 470 are connected to the respective eight inputs of the NAND gate 120. When no match is found in any of the eight comparators during a particular H/2 period, all the outputs of the eight flip-flops will become high and the output signal HE (hit enable) of gate 120 will become low. However, if a match for all the bits compared during an H/2 period is found at any one of the comparators, the output signal of this particular comparator does not change the output of the flip-flop connected thereto to high. Consequently, one of the inputs of the gate 120 stays low and, therefore, the output signal HE at the output of gate 120 stays high. Thus, gate 120 is enabled by the MATCH signal at the output of a particular comparator. The signal HE is fed into a look-up decoder circuit 291 which will be described below. It is to be noted that in FIG. 1 only one circulating register 424 and one comparator 440 is shown to simplify the block diagram.

In the ENROLL Mode, the Indirect Address form of an 80-bit word is entered into circulating register 424 of the look-up read comparator 126 on line D50 from the master keyboard 134 (see FIG. 1) via computer 15. Via the rest of the lines D51 to D57 a known word is fed into the circuit in order to prevent the comparators which are not utilized during the look-up read process from having a false match output signal. Thus, the flip-flops 458 to 470 are set high by these known words. The 80-bit input word is entered via line D50 into the multiplexer 420. It is fed to the input of the circulating register 424 and from there into the first input of the comparator 440. Into the second input of this comparator 440 look-up data via line SB is fed serially. The comparator 440 compares the serial 80-bit word with all the 80-bit words on line SB bit by bit. During each 80-bit period, at a first bit compared which does not match in comparator 440 the output of the associated flip-flop 456 becomes high and the output of the gate 120 becomes low. If no match with any of the words is found this indicates that the indirect address entered in the circulating register 442 has not been previously used in the file. This situation is similar to the above-described process during the ENTER/EXIT mode, when no match has been found. The 80-bit word from the circulating register 424 is fed via line WLU to gate 269 (FIG. 6c) and upon receiving a WLUEN signal from flip-flop 268, it is fed via line $\overline{WLU}$ to gate 730 for recording on the look-up track, as will be described later with reference to FIG. 6g.

In case all the bits compared during an H/2 period match, the output of the related flip-flop 456 stays low during the entire H/2 period and gate 120 is enabled to produce a high HE.

The HE signal from the gate 120 is utilized to control a main hit latch 372 in the look-up read decoder 291 (FIG. 6c) which will be described later. The decoder 291 has three possible output signals on line IS (Input Strobe) depending on its input signals SB, HE with respect to the various timing signals, related to the bit count as follows.
1. 2 pulses indicating that a first empty segment (FES) on the look-up track has been found;
2. 3 pulses indicating that a match only for Indirect Address No. 2 has been found; and
3. 4 pulses indicating that matches for both Indirect Addresses Nos. 1 and 2 have been found.

The line IS from the decoder 291 is connected to a FIFO No. 1 (first in - first out) asynchronous register 472 (FIG. 6d) into which the direct addresses (segment numbers) corresponding to the above listed situations (1), (2) and (3) respectively are loaded and transferred therefrom to the computer. The operation of the FIFO No. 1 register 472 will be described later in more detail.

When an Indirect Address No.1 or No.2 match is indicated by an HE signal from gate 120, the decoder circuit also generates control signals to transfer an instant segment number from multiplexers 254 and 256 via multiplexers 258 and 260 into the FIFO No.1 register 472, along with the information identifying which indirect address request did match, obtained from J-K flip-flops 456 to 470.

Now, the look-up read decoder 291 for generation of two, three or four IS pulses respectively will be described (FIG. 6c). It has been previously mentioned that two output pulses indicate that a first empty segment (FES) has been found during reading the contents of the look-up track.

Normally, when a picture information is recorded on the disc and the corresponding 80-bit word is recorded on a predetermined segment on the lock-up track, a picture bit pulse is inserted between bits 68 and 69 1/2 of that word by the computer 15. By the FES (first empty segment) hit an absence of that picture bit pulse between bits 68 and 69 1/2 of an 80-bit word shown in FIG. 4 is understood. Absence of a pictures bit indicates that no picture has been recorded on the corresponding address of an associated video track segment.

First the logic circuitry for locating a FES hit will be described. A comparator 328 (FIG. 6c) is connected at its inputs to the lines Q10, Q11, Q12 and Q13, respectively. It is preset to have an output $f(4)$. Analogously, the inputs of a comparator 330 are connected to the same respective lines Q10 to Q13. This latter comparator 330 is preset to form an output $f(5)$. The output of the comparator 328 is connected to the first and second input of a three-input NAND gate 344. A third input of this gate is connected to the output $f(64)$ of the counter 216 (FIG. 6a). Gate 344 is thus enabled at $f(64) + f(4) = f(68)$. On the other hand, a three-input NAND gate 346 has its first input connected to the output $f(5)$ of comparator 330, its second input to output $f(64)$ of counter 216 and its third input to line $\overline{CL2}$. As previously described, $\overline{CL2}$ is the master clock pulse which is delayed from pulse CL2 by one half period. Consequently, the output of the gate 346 is enabled at $f(64) + f(5) + f(\frac{1}{2}) = f(69\frac{1}{2})$, where $f(\frac{1}{2})$ represents the above delay. The output $f(68)$ of gate 344 sets a latch 348 and the output of gate 346 resets this latch at $f(69\frac{1}{2})$. The output of latch 348 is connected to a first input of a three input NAND gate 356. The second input of gate 356 is connected to the output CL5 of a monostable multivibrator 350. The input of this multivibrator is connected to the output CL4 of the previously described multivibrator 280. The clock pulse CL5 is slightly delayed against CL4 by approximately 6 nonoseconds. The third input of gate 356 is connected to line SB via an inverter 386. Line SB feeds the look-up data reproduced from the look-up track of the disc into gate 356, 80 bits serially during an H/2 period. The data is sampled at a CL5 rate by the gate 356 between counts 68 and 69 $\frac{1}{2}$. The clock pulse CL5 is delayed to fall into the center of a picture/no picture bit between bits 68 and 69 $\frac{1}{2}$ at the input of gate 356. If the absence of a picture bit on the look-up track is sensed by gate 356 between counts 68 and 69 $\frac{1}{2}$ (see FIG. 4), which indicates a FES, gate 356 is enabled. It sets a latch 360 connected thereto. Latch 360 in turn enables a monostable multivibrator 380. This multivibrator generates approximately a 3 microsecond enable signal. At a presence of a FES, the output 2 of the multivibrator 380 is low. This output is connected to a first input of a NAND gate 388. The second input of gate 388 is connected to output 1 of a main hit latch 372 which will be described below. Latch 360 is reset at every revolution of the disc by pulse CIT delayed in multivibrators 270 and 272 (FIG. 6b) to insure that only one FES per revolution of the disc is obtained. Thus, the output of gate 388 becomes high when a FES has been detected and HE is low (no comparison for an Indirect Address No.1 or No.2 has been found), that is when output 1 of the main hit latch 372 (connected to the second input of gate 388) is high, as will be described below.

A four input NAND gate 342 has its respective inputs connected to lines Q10, Q11, Q13 and $\overline{Q12}$ (Q12 inverted via inverter 332). Gate 342 has an output f(11). A two input NAND gate 340 has its respective inputs connected to lines Q10 and $\overline{Q11}$ (Q11 inverted via inverter 334). Gate 340 has an output $f(13)$. A NOR gate 352 has one input connected to the output of gate 342 and a second input to an output $f(32)$ of the comparator 308, of the previously described circuit 287 shown in FIG. 6b. Thus, the gate 352 is enabled at $f(11) + f(32) = f(43)$. The output $f(43)$ of gate 352 is fed into one input of a NAND gate 354, the second input of which is connected to the output $f(13)$ of gate 340. Thus, gate 354 is enabled at $f(43)$ and changes state at $f(45)$.

One input of a latch 370 is connected to the output of gate 354. Latch 370 sets its output 1 high at $f(43)$ and resets it low at $f(45)$. This output 1 is connected to one input of a NAND gate 414. Output 2 of latch 370 is connected to one input of a latch 384, to one input of a NAND gate 408 and to one input of a 3 input NAND gate 410. The second input of gate 410 is connected to the output of latch 384 and the third input to line Q10. The output of gate 410 is high all the time except at $f$

(45) when it is low. This output signal from gate 410 is inverted by an inverter 416 and the output of inverter 416 is connected into one input of a NAND gate 418. Into the other input of gate 418 the signal HS/2 is fed. Consequently, the output of gate 418 is high except at $f(45)$ and HS/2 periods when it becomes low and resets the previously mentioned J-K flip-flops 456, 458, 460, 462, 464, 466, 468 and 470 (see FIG. 6d). As a result, signal HE at the output of gate 120 becomes high at $f(45)$ and HS/2 time.

A two input NAND gate 386 (FIG. 6c) has one input connected to the output $f(43)$ of gate 354. The second input of gate 368 is connected to the $f(66)$. Consequently, the output of gate 368 becomes high at functions $\overline{f(66)}$ and $\overline{f(43)}$. A three-input NAND gate 369 has one input connected to the output of gate 368, a second input to line CL2 and a third input to the output HE of the previously mentioned 8-input NAND gate 120, shown in FIG. 6d. Consequently, the output of gate 369 goes low when HE, $f(66)$ [or $f(43)$] and $\overline{CL2}$ are high, simultaneously. That is, when a match for an Indirect Address No.1 has been found at $f(43)$ time, or when a match for Indirect Address No.2 has been found at $f(66)$ time. This situation causes a low output signal at output 1 of latch 372, and a high output signal at its output 2. A positive AND gate 412 has one input connected to the output 2 of latch 372. The second input of gate 412 is connected to the output of a NAND gate 408 which is described below.

A three input NAND gate 364 has one input connected to output $f(64)$ of the counter 216 (FIG. 6a). Its second and third input is connected to lines Q12, Q13, respectively. Consequently, gate 364 has a low output $f(64) + f(12) = f(76)$ (see TAB. 2). One input of a latch 366 is connected to the output $f(76)$ of the gate 364, a second input of latch 366 is connected to the output $\overline{f(66)}$ of the previously described gate 300 (see FIG. 6b). Thus, latch 366 is set at $\overline{f(66)}$ and reset a $f(76)$.

A four-input NAND gate 374 has two inputs connected to line Q13 via an inverter 358, a third input to line Q12 via an inverter 362 and a fourth input to the output of latch 366. Thus, the output of gate 374 is $f(67)$. Another four-input NAND gate 376 has one input connected to line Q11, a second input to line Q12 and a third and fourth input to the output of latch 366. The output of gate 376 is $f(70)$. Still another four-input NAND gate 378 has one input connected to line Q11, a second input to line Q13 and a third and fourth input to the output of the latch 366. Gate 378 has an output $f(74)$. The respective outputs $f(67), f(70)$ and $f(74)$ of the respective gates 374, 376 and 378 are connected each to one distinct input of a four input NAND gate 382. Besides that, output $f(67)$ is also connected to a second input of gate 408 and output of $f(70)$ to one input of a NOR gate 398. The output of gate 382 is connected to one input of a NAND gate 402. The other input of gate 402 is connected to the line Q10 (Q10 inverted via inverter 314 - see FIG. 6b). Gate 402 is enabled at $f(67), f(70)$ and $f(74)$, respectively. The output of gate 402 is connected to one input of a NAND gate 404. The second input of gate 404 is connected to output $\overline{f(43)}$ of gate 354. Thus, the output of the gate 404 becomes high at $f(43), f(67), f(70)$ and $f(74)$, respectively. The output of gate 404 is connected to one input of a positive AND gate 406. The second input of gate 406 is a strobe enable pulse on line SE from the computer 15 which pulse is high during $f(43)$ through $f(74)$. The output of the gate 406 is connected to a first input of a positive AND gate 390. The second input of gate 390 is connected to the output of the previously described gate 388.

As previously described, the output of gate 388 is high when a FES is indicated between $f(68)$ and $f(69 ½)$ and HE is low, that is, no comparison has been found for Indirect Addresses No.1 or No.2.

This situation occurs, e.g., when a new individual is to enrolled in the system and his video picture information is to be stored in the disc file. Then a new Indirect Address No.1 is compared with the contents of the look-up track. When no comparison is found, the system automatically locates a FES.

One input of gate 408 is connected to the output $f(67)$ of gate 374. The other input of gate 408 is connected to output 2 of latch 370. Thus, the output of gate 408 is high at $f(67)$ or $f(43)$ through $f(45)$. Then, also one input of gate 412 connected thereto is high. The output of gate 412 is connected via an inverter 486 to multiplexers 258 and 260 (FIG. 6d) via line (A/B)2. It forms a path for an input control pulse which sets the multiplexers 258 and 260 to pass output signals corresponding to respective input signals fed to portion A of the multiplexers, when output of gate 412 is low and output of inverter 486 is high. On the other hand, the signal (A/B) 2 controls the multiplexers 258, 260 to pass output signals corresponding to respective input signals fed to portion B of these respective multiplexers when output of gate 412 is high, that is, at $f(43)$ or $f(67)$, if also HE is high. In the latter case the contents of the respective J-K flip-flops 456 through 470 shown in FIG. 6d are fed via the multiplexers 258, 260, FIFO No.1 472 asynchronous register and output lines D60 to D68 to the computer 15 (see FIG. 6d). Asynchronous register FIFO No.1 472 can store 40 8-bit words simultaneously and feed them to the computer upon request (at a presence of an output strobe OS from the computer). This transfer of data occurs e.g. when a match for an Indirect Address No. 1 or No.2 or a FES has been found.

As previously mentioned, NAND gate 414 of the circuit 291 (FIG. 6c) has one input connected to output 2 of the main hit latch 372 and another input to the output 1 of latch 370. The output of gate 414 is connected to one input of a NAND gate 478 (FIG. 6d). The output 1 of the multivibrator 380 is connected to one input of a NAND gate 480 (FIG. 6d). The other input of gate 480 is connected via inverter 482 to the output $f(72)$ of gate 376. The output of gate 480 is in turn connected to the other input of gate 478. The output 08 of gate 478 is a control signal fed to the computer via FIFO No.1 472 (see FIG. 6d). Signal 08 is high at $f(43)$ when HE is high (a match has been found for an Indirect Address No.1) or at $f(70)$ when a FES has been found. Signal 08 determines what type of bit was decoded by circuit 291 (indirect address or FES hit) and informs the computer thereof.

The output of gate 410 (FIG. 6c) is connected via inverter 416 into one input of a NOR gate 418. The second input of gate 418 is connected to line HS/2. The output of gate 418 is thus high at $f(43)$ to $f(45)$ as described previously. This latter signal resets the J-K flip-flop of circuit 126 and prepares them for an Indirect Address No.2 comparison.

Two NOR gates 392, 398, two inverters 394, 400 and a NAND gate 396, respectively are utilized to generate a control (A/B) 1 signal which is employed to switch inputs of the respective eight-input four-output multiplexers 254, 256.

Into the portion A of multiplexer 254 lines A3 to D3 from the horizontal half-line counter 222 previously described and shown in FIG. 1a are fed. Into the B portion of counter 254 lines A5 to D5 are fed. The output from multiplexer 254 is controlled by the (A/$\overline{B}$) 1 signal in an analogous manner as previously described in connection with signal (A/$\overline{B}$) 2.

Analogously, into portion A of multiplexer 256 lines A4 to D4 from the counter 222 are fed. Into portion B lines A6, B6 and B7, carrying information about the disc quadrant and side number, as previously disclosed, are fed.

Signal (A/$\overline{B}$) 1 is generated as follows: one input of gate 392 is connected to output 2 of the multivibrator 380. The other input of gate 392 and one input of gate 398 are connected to output $f$ (70) of gate 376. The second input of gate 398 is connected to output 1 of the main hit latch 372. The respective outputs of gates 392, 398 are connected via respective inverters 394, 400 to two respective inputs of gate 396. The output of gate 396 is the control signal (A/$\overline{B}$) 1. Thus, when the output of gate 396 is low the signals on lines A5 to D5 and A6, B6, A7 fed into B portion of multiplexers 254 and 256 respectively will be transferred to multiplexers 258 and 260, respectively. However, if HE is high or at $f$ (70) if a FES is located, output of 396 becomes high and switches multiplexers 254, 256 to transfer signals A3 to D3 and A4 to D4 to multiplexers 258, 260, respectively.

The output 2 of multivibrator 380 is connected to one input of a NAND gate 484. The second input of gate 484 is connected to output 1 of the main hit latch 372. The output of gate 484 forms an input enable signal IE fed into FIFO No.1 472. It enables FIFO No.1 to enter data from multiplexers 258, 260 if a FES or match is indicated, respectively.

Let us assume now that matches for both Indirect Addresses Nos.1 and 2 have been found. Four output pulses from the positive AND gate 390 will be generated as follows. At one input of gate 369 signal HE is high. Gate 369 is enabled at $f$ (43) and $\overline{f(66)}$, respectively. The output signal from gate 369 sets latch 372 output 1 low, output 2 high. One input of gate 412 and one input of gate 414, is high. Output 1 of latch 372 sets one input of gate 398 and one input of gate 388 low. The other input of gate 388 is set high during the entire 80-bit period. Therefore, the gate 388 is enabled from HS/2 till $f$ (43) and from $f$ (45) till $f$ (66) and its output is high. It sets one input of gate 390 high. The latch 372 is reset at an HS/2 rate. The output of latch 366 is set high at $f$ (66) and set low at $f$ (76). This output of latch 366 enables the gate 374 at $f$ (67), gate 376 at $f$ (70) and gate 378 at $f$ (74), when the repective outputs of these respective gates are set low. As mentioned before, one input of the positive AND gate 390 is connected to the output of gate 388 and is set high. The other input of the gate 390 is connected to the output of the positive AND gate 406. At $f$ (43) one input of gate 404 which is connected to the output of the gate 354 is low, the output of gate 404 is thus high. The other input of the positive AND gate 406 is a strobe enable (SE) pulse from the computer, which is high at $f$ (43). Thus, the output of gate 406 is high at $f$ (43) and so is the second input of previously mentioned positive AND gate 390, connected thereto. Consequently, a first output pulse is generated at the output of gate 390 at $f$ (43).

Now, generation of a second output pulse from gate 390 at $f$ (67) will be described. At $f$ (67), the conditions on the respective inputs of gate 388 did not change, thus the output of gate 388 is high and, consequently, one input of gate 390 connected to this output is high. At $f$ (67), one input of gate 382 connected to output of gate 374 is low, the output of gate 382 is thus high. The output of gate 402 is low, therefore, the output of gate 404 is high. The strobe enable from the computer on line SE is present at $f$ (67). Consequently, the output of gate 406 is high. It is connected to the second input of gate 390, the first input of which is also high as above described. Thus, a second output pulse from gate 390 is generated.

A third output pulse from gate 390 is generated at $f$ (72). Analogously as before, the output of gate 388 and one input of gate 390 stays high. The output $f$ (70) of gate 376 is low, also one input of gate 398 is low and one input of gate 382 is low. The output of gate 382 is high, one input of gate 402 is high, thus output of gate 404 is high. At $f$ (72) the SE signal from the computer is present. The output of gate 412 and the second input of gate 390 are high, and a third output pulse is generated from gate 390.

Analogously, $f$ (74) the output of gate 378 is low, the output of gate 402 is low, the output of gate 404 is high. The SE signal is high and the output of gate 406 is high. It enables the gate 390 which generates the fourth output pulse.

In the previous description a process for generating four output pulses from the gate 390 has been described, provided both Indirect Addresses Nos.1 and 2 found a match with corresponding addresses stored on the look-up track. With reference to the above description the process of generating three and two output pulses from gate 390 will be now described.

As mentioned before, three output pulses from gate 390 are generated when no match for the Indirect Address No.1, but a match for Indirect Address No.2 has been found. Obviously, between $f$ (7) and $f$ (42) signal HE is low because no match has been found during the period of Indirect Address No.1 (see FIG. 4) and the outputs of flip-flops 456 to 470 stay high. Consequently, gate 369 is inhibited, output 1 of the main hit latch 372 is high, output of gate 388 is low and one input of the positive AND gate 390 is low. Gate 390 is thus inhibited and the previously described first output pulse from this gate cannot be generated. At $f$ (45) the output of gate 418 resets the output of the J-K flip-flops (FIG. 6d) low causing HE to go high and in case a match for an Indirect Address No.2 is found, HE stays high. It enables gate 369 which in turn sets the main hit latch 372. Gate 388 is enabled and the process for generating three output pulses at $f$ (67), $f$ (72) and $f$ (74) is repeated as above described.

When no match is found for both Indirect Addresses Nos.1 and 2, only two output signals will be generated when a FES is located as follows. Signal HE is low at $f$ (43) and $f$ (66) and, therefore gate 369 cannot enable the main hit latch 372. The output 2 of monostable multivibrator 380 is high during $f$ (43) and $f$ (66). It is connected to one input of gate 388 as previously described. The other input of gate 388 which is connected to output 1 of latch 372 is also high. Output of 388 is thus low and inhibits gate 390 during $f$ (43) and $f$ (66)

f no match of both Indirect Addresses Nos.1 and 2 is found.

If a FES is now located between $f(68)$ and $f(69 \frac{1}{2})$, the signal $\overline{SB}$ at the input of gate 356 is high, output of gate 356 is low. It sets output of latch 360 high, while output 2 of multivibrator 380 is low. Latch 360 is reset by pulse CIT. Output 2 of multivibrator 380 stays low for about 3 microseconds. It sets output of gate 388 high and enables gate 390 at $f(72)$ and $f(74)$ when high output pulses occur from gate 406, as described before with reference to the generation of three and four pulses.

Now the circuitry for inserting an 80-bit data word comprising track, quandrant and side number (segment number), Indirect Address No.1, area authorization and picture bit in the video signal, prior to its recording on the disc and for separating this data from the video signal retrieved from the disc will be described. To this data inserted in the video signal will be referred in the further description as to "data in video" or "data in picture". In the preferred embodiment of the invention, this 80-bit word is recorded three times for redundancy on selected horizontal lines of the video signal as shown in FIG. 2a. In the preferred embodiment described herein, the data is recorded bit-by-bit in the respective horizontal blanking intervals of the selected horizontal lines, but the invention is not limited thereto. Thus, a number of these data bits may be recorded within these selected horizontal lines.

Attention is directed now to FIG. 6e showing a horizontal line decoder 500. The decoder 500 comprises BCD comparators 501 to 518 into which the output lines A3 to D3, A4 to D4 and A5 to D5 from the previously described horizontal BCD segment counter 222 shown in FIG. 6a are connected. These comparators are preset to specific counts designating selected horizontal lines on which serial data in video is to be recorded. The highest count to which these comparators are preset is 508 horizontal half-line counts which count in reality represents 254 horizontal lines. The count to which each individual comparator is preset is indicated in quotation marks in the drawing. Thus, comparators 501, 507 and 513 are combined to be preset to count 020 (which means 20 horizontal half-lines, that is 10 full horizontal lines), comparators 502, 508 and 514 are preset to count 180, comparators 503, 509 and 515 to count 184; comparators 504, 510 and 516 to count 344; comparators 505, 511 and 517 to count 348 and comparators 506, 512 and 518 to count 508. The outputs of these respective comparators are designated by a letter "F" followed by the particular preset count in parentheses. It is emphasized that these symbols designate particular counts related to particular numbers of full horizontal lines from 10 to 254, as shown in FIG. 2a. The numbers in parentheses are, however, numbers related to horizontal half-line counts. These symbols are to be distinguished from the reference characters designated by letter $f$ utilized throughout the specification which have been previously defined and which designate particular bit counts from the 80-bit counter 212 shown in FIG. 1a. The duration of one bit-count designated $f$ is 396.8 nanoseconds, while the length of one horizontal half-line period designated F is 31.746 microseconds.

The horizontal line comparator 500 is connected to a timing circuit 664 which forms timing signals designating the selected horizontal lines of the picture field on which the data bits are to be inserted in the horizontal sync interval. In the timing circuit 664 a positive AND gate 534 is utilized, which is enabled by signals PE and clock CL2D. The signal PE is derived from the 80-bit counter 212 via gates 520 and 281 (FIG. 6a) and represents the top count 79. The output from gate 534 is connected to one input of NAND gates 536, 540, 546, 550, 560 and 564 respectively. The other input of gate 536 is F (20) from comparators 501, 507 and 513. The output of 536 sets a latch 538 at PE and F (20). The output of latch 538 is fed to one input of a NAND gate 570. The other input of gate 540 is F (180) from comparators 502, 508 and 514. The output of gate 540 sets a latch 544 and resets latch 538 at F (180). At F (180) a $\overline{WIS}$ strobe is generated at the output of latch 544 and fed to one input of a NOR gate 572. A NAND gate 542 resets latch 544 one bit later at F (181) which ends strobe $\overline{WIS}$.

The second input of gate 546 is connected to F (184) from comparators 503, 509 and 515. An output $\overline{F}$ (184) is generated at the output of gate 546 and it sets a latch 548. An output of latch 548 is connected to the second input of gate 570. The second input of gate 550 is connected to output F (344) from comparators 504, 510, and 516. At F (344) output from gate 550 resets latch 548 and sets a latch 554. An output strobe $\overline{W2S}$ is generated at F (344) and fed to a second input of gate 572. A NAND gate 552 resets latch 554 at F (345) and ends strobe $\overline{W2S}$.

The second input of gate 560 is connected to output F (348) of comparators 505, 511 and 517. The output $\overline{F}$ (348) from gate 560 sets a latch 562. The output of latch 562 is fed to a third input of gate 570. The second input of gate 564 is connected to output F (508) of comparators 506, 512 and 518. The output $\overline{F}$ (508) from gate 564 sets a latch 568 and resets the latch 562. An output strobe W3S is generated at F (508) and fed to a third input of gate 572. A NAND gate 566 resets latch 568 at F (0) and ends strobe $\overline{W3S}$.

Thus, gate 570 has a high output WMKI (word mask 1) at counts 20 to 180 (horizontal lines 10 to 90), counts 184 to 344 (horizontal lines 92 to 172) and 348 to 508 (horizontal lines 174 to 254). Signal WMKI enables a counter 598 which divides the incoming signal by 9. The output of counter 598 is an LE (latch enable) signal fed into two 4 input/4 output latches 666 and 668 shown in FIG. 6f which will be described latter.

Gate 572 has a high output signal WMK2 (word mask 2) between counts 180 to 181, 344 to 345 and 508 to 0.

A data-in-video synchronizer circuit 700 shown in FIGS. 6e and 6f is utilized to generate clocking and control pulses to ensure proper timing for the operation of a serial-to-parallel buffer 575, 4 input/4 output latches 666 and 668, multiplexers 670 and 672, asynchronous register FIFO No.2 674 and parallel-to-serial buffer 692 which devices are utilized to insert data supplied by the computer in parallel form on selected horizontal lines of the video signal in serial form and to transmit the extracted serial data from the video to the computer in parallel form, respectively.

In the Data-In-Video Recording Mode, data to be inserted in the video signal prior to its recording on the disc are transferred from the computer memory via lines D0 to D7 into one set of four inputs of multiplexers 670 and 672, respectively. These multiplexers have three sets of four-bit inputs switchable into one set of four-bit outputs. The switching is actuated by input signals IE10 and IE12 generated by two respective flip-flops 628 and 630. These flip-flops are in turn controlled by the computer via lines D8, D9 respectively. Line D00 is an input from the computer to control IS10 input strobe of register 674. Line D10 from the computer clears the registers 674.

In the Data-In-Video Recording Mode the signal IE10 is high and IE12 is low. The data in parallel form supplied by the computer via lines D0 to D7 is loaded from multiplexers 670, 672 into the asynchronous register FIFO No.2 674, upon obtaining an IS10 (input strobe) pulse at the output of a gate 642 in circuit 700. Depending on the timing and control signals from circuit 700, initiated by the computer program, the data from the computer obtained by multiplexers 670, 672 and stored in FIFO No.2 register is either transmitted into the parallel-to-serial buffer 692 (FIG. 6g) from 674 or it is circulating from the respective outputs of 674 via respective line drivers 675 to 682 into a second set of 4-bit inputs of the respective multiplexers 670, 672 (as indicated by arrows) and through the outputs of these multiplexers back to FIFO No.2 674. In either case an OS10 (output strobe) is generated at the output of a gate 622 of circuit 700 and an OE10 (output enable) pulse is generated at the output of gate 576 of citcuit 700, respectively. When the data is ready to be shifted out from the register 674 in parallel form, an OR (output ready) signal is fed from 674 to a NAND gate 690. The circulation of the data is necessary in order to retain it in the register 674 until ready for transfer into buffer 692 (FIG. 6g). The circulation of the data stored in register 674 occurs when both signals IE10 and IE12 are high.

A multivibrator 626 has a delay of 43 nanoseconds and a multivibrator 624 has a delay of 76 nanoseconds. Upon obtaining an output signal from the monostable multivibrator 626 of circuit 700 and an OR signal, an SL signal (shift/load) is generated by gate 690. Upon receiving a CLY clock signal from a three bit binary counter 600 utilized as a divider by 8, the data from the parallel-to-serial buffer 692 is shifted serially bit-by-bit out via line DW (data to write in video) to a NAND gate 662 (FIG. 6f). Signal CLY occurs at a horizontal line rate, namely during the occurrence of the back porch of the horizontal sync interval. The serial data bits are transmitted from buffer 692 via line DW at every incoming CLY clock pulse. Signal SL enables loading data into the buffer 692. Thus, both control signal OR and output of 626 have to be high prior to loading register 692. Then output of gate 690 is low and initiates loading of 8 parallel bits from register 674 into buffer 692.

Now the previously described circuitry will be considered for a Data-From-Video Reproducing Mode. A video signal VAD (video and data) with the data bits inserted thereon is reproduced from the disc and transmitted via a video switcher 125 circuit (FIG. 6g) to a sync and video stripper circuit 127 (FIG. 6f). Circuits 125 and 127 will be described later in more detail. An output signal SB (serial data) from the circuit 127 which represents data in serial form extracted from the video signal is fed via a line receiver 698 (FIG. 6f) into an input of the serial-to-parallel buffer 575. The input of this buffer is enabled by the previously described signal WMKI from the output of gate 570 (see FIG. 6e). As previously disclosed, signal WMKI is high between counts 20 and 180 (horizontal lines 10 to 90), counts 184 and 344 (lines 92 to 172) and counts 348 and 508 (lines 174 to 254). An RDC (read data clock) signal is supplied to the buffer 575 by a gate 585, which signal occurs at an H-rate and it is delayed to coincide with the center of every incoming SB pulse in the buffer 575. Buffer 575 reads in eight serial bits from line SB and transfers them in parallel to latches 666 and 668 respectively. These latches are enabled by the signal LE (latch enable) from the output of counter 598 (FIG. 6e) which is a divider by nine as previously mentioned. These eight bits are then stored at the outputs of latches 666 and 668 and transferred to multiplexers 670, 672 respectively, upon reception of a proper combination of signals on lines IE10, IE12 which is in this case IE10 high and IE12 low. Upon receiving signals IE10 and IE12 the 8 bits of SB data are read in parallel form into multiplexers 670, 672 respectively and transferred into the asynchronous register FIFO No.2 674 in the same manner as previously described in connection with the Data-In-Video Recording Mode.

It is to be noted that in a mode of operation when look-up data is reproduced from the look-up track, this data follows the same path as the data from video; via video switcher 125, line VAD, stripper 127 and line SB. However, in this mode of operation the buffer 575 is not enabled to enter the data which is fed then into the look-up decoder circuit 291, as it has been previously described.

The data extracted from the video signal is fed from the parallel-to-serial buffer 692 via line DR into a majority word comparator 806 in a serial form (bit-by-bit). Line DR is connected to first inputs of respective NAND gates 774, 778 and 782. The respective second inputs of these gates are connected via respective inverters 766, 768 and 770 into respective outputs of NAND gates 760, 762 and 764. One input of respective gates 760, 762 and 764 is connected to line WMK2. The second input of gate 760 is line WIS which is high at F (180 to 181) as previously described. The second input of gate 762 is W2S which is high at F (344 to 345). The second input of gate 764 is high at F (508 to 0). Line WMK2 is high during any of these periods. Thus, during these periods both inputs of respective gates 760, 762, 764 are high, their respective outputs are low. The outputs of respective inverters 766, 768 and 770 are high. These respective outputs are connected to second inputs of respective NAND gates 774, 778 and 782 as mentioned before. The inputs of inverters 766, 768 and 770 are connected to respective first inputs of NAND gate 770 are connected to respective first inputs of NAND gates 772, 776 and 780. Thus, if the respective first inputs of gates 774, 778 and 782 are high and the respective second inputs of gates 772, 776 and 780 are low, gates 772, 776 and 780 are enabled outside the periods F (180 to 181), F (344 to 345) and F (508 to 0), respectively. At the same time gates 774, 778 and 782 are inhibited, respectively. analogously, during the above designated periods of time the condition of all these gates is reversed. NOR gates 790, 792 and 794 are, however, enabled in either situation. Thus, during F (180 to 181) the first 80-bit word is loaded into a circulating register 784 via line DR, during F (344 to 345) the second 80-bit word is loaded into a circulating register 786 and during F (508 to 0) the third 80-bit word is loaded into a circulating register 788.

At 9 (182) when line WIS goes low, gate 774 becomes inhibited and the 80-bit word previously loaded into circulating register 784 begins to circulate via gates 772, 790 at a rate of 2.54 MHz, which is the frequency of φ IN, φ OUT clock pulses which drive all the circulating registers utilized in the system.

Analogously, at F (346) when W2S goes low, gate 776 becomes inhibited and the 80-bit word loaded in register 786 begins to circulate. Analogously to the above description, at F (0) the word loaded into register 788 starts circulating via gates 794 and 780. The respective outputs of NOR gates 790, 792 and 794 are connected to respective inputs of a two-out-of-three majority comparator 796 which compares the serial inputs at every bit and the majority bits exit via the output of register 796 into an 80-bit register 798. The majority word from register 798 is fed into a "D" flip-flop 800 which is gated by the majority clock pulse MC. The majority clock pulse is generated by the gating selection network 808 shown in FIG. 6a. Comparators 810, 812 (FIG. 6a) receive input signals from the computer 15 via lines D20 to D23 and D25 to D27 into one set of inputs, while another set of their inputs receive outputs from the 80-state counter 212 via lines Q10 through Q22. Every time a match is found in comparators 810, 812, an output signal therefrom is sent to the gating selection network 808. One output of the network 808 is an enable pulse $\overline{HS/2}$ fed to the multiplexers 420, 422 (FIG. 6d) as previously described. The other output of network 808 is the above-mentioned majority clock pulse MC. The majority data is transmitted from flip-flop 800 (FIG. 6e) bit by bit in MC intervals to the computer 15 shown in FIG. 1.

Attention is now directed to the signal at the output of gate 662 (FIG. 6f). The signal from the parallel to serial buffer 692 (FIG. 6g) is clocked by gate 662 in H-line intervals and it represents the 80-bit data in serial form to be inserted bit by bit on the back porch of the horizontal sync pulses of the video signal as shown in the diagram of FIG. 2b. Thus, one 80-bit word is recorded in 80 horizontal lines of the picture field. However, in the preferred embodiment of the invention this word is repeatedly recorded three times for redundancy 3 × 80 = 240 selected horizontal lines as it will be described now.

The data word $\overline{DW}$ from the output of gate 662 is fed into one input of a NAND gate 734. The second input of this gate is the look-up enable signal $\overline{LU}$ from the computer 15. On the other hand, to a NAND gate 730 the serial data to be recorded on the look-up track is fed via line $\overline{WLU}$. To the other input of gate 730 the $\overline{LU}$ signal is fed via an inverter 728. The input of the inverter 728 and the second input of gate 734 are interconnected. Consequently, when look-up data is recorded on the look-up track via gate 730, gate 734 is inhibited and the data to be inserted in the video signal cannot get through, and vice versa, when gate 734 is enabled, gate 730 is inhibited. This arrangement eliminates the possibility of recording look-up data in the video signal or data to be recorded in video signal on the look-up track by error. The respective outputs of gates 730, 734 are fed into two separate inputs of a AND gate 732 and via a NAND gate 746 to one input of a NOR gate 748. The second input of gate 748 is connected to an output from a circuit consisting of an inverter 736, NAND gates 738, 740 and positive AND gates 742, 744. This circuit is enabled when the look-up track is inhibited and $\overline{LU}$ signal is high Then a composite sync signal CSO supplied by a circuit 814 is enabled through the gate 748. In case no data is supplied through gate 748, this gate could still be enabled to let CSO pass through. The output signal of gate 748 is clamped by a clamping circuit 750 to a predetermined DC level prior to inserting a data bit on the back porch of the horizontal sync. Thus, on line DAS (data and sync) data bits with composite sync added or data bits only or composite sync only, respectively, can be fed to one input B of a video switcher 754, depending on the instant mode of operation, in accordance with the control signals 30 to 34 from the computer as follows.

A second input A of the video switcher 754 is connected to a signal input terminal 816. Via this input terminal video signal to be recorded from the television camera 131 (FIG. 1) or video signal with data bits therein reproduced from the disc or data bits reproduced from the look-up track could be fed in. A signal switcher 752 is connected to a control input C of the video switcher 754 which provides switching between the first and second input signals of the video switcher 754. Signal switcher 752 is implemented by a transistor controlled by a video switcher control citcuit 818. Circuit 818 provides timing signals for switching on and off transistor 752. It is controlled by control signals at input terminals 30 and 31 from the computer 15 (FIG. 1). Besides that, the signal through the switcher 754 is also controlled by the computer via terminals 32 and 33. Via terminal 33 the previously described $\overline{LU}$ look-up enable control signal is supplied. Thus, the control signal at terminal 31 is high and 30 is low when only video signal from input 816 is supplied via switcher 754; when terminals D32 and D33 are high and D30 is low then only CSO and data bits are supplied via switcher 754; when terminals 30, 31 and 33 are high and 32 is low then both video and sync are supplied via switcher 754; and the respective control signals at all four terminals 30 to 33 are high when data, CSO and video are supplied via switcher 754. The video switcher control circuit 818 provides proper timing in every mode of operation of the video switcher 754.

The signal to be recorded on the disc is fed from the video switcher 754 via a current amplifier 756 to output terminals 820. From the output terminals 820 the signal is transmitted to the record electronics 113 (see FIG. 1).

An output signal on line VAD (video and data) from the video switcher 754 representing a signal reproduced from the disc, such as data bits from the look-up track or video signal with data bits recorded thereon, is fed from the current amplifier 756 into a sync and video stripper circuit 127, as previously described.

Circuit 127 comprises an emitter follower 902, a high gain current amplifier 904, a limiter 906, current amplifier 910, inverter 908, latch 912, multivibrator 902, a high gain current amplifier 904, a limiter 906, current amplifier 910, inverter 908, latch 912, multivibrator 825, and a flip-flop 914. In circuit 127 the sync and video signal, respectively are stripped off the data bits in a conventional manner. The data bits from circuit 127 which have been stripped off the video and sync are fed line SB and line receiver 698 to the serial-to-parallel buffer 575 as it has been previously described.

Look-up reproduced from the look-up track of the disc is fed from the transducer 119 (FIG.1) via the same signal path as above described, into the look-up decoder 291 as disclosed previously.

The composite sync of the reproduced video signal is fed from the video and sync stripper circuit 127 via line CSL into a mixer 814 (FIG. 6g) where a stable reference vertical sync pulse CS (from an independent sync and clock generator 333 in FIG. 1) is mixed therewith. Thus, the composite sync CSO at the output of circuit 814 has its horizontal sync derived from the reproduced video signal having inherent time base errors due to recording and reproduction process and its vertical sync derived from a stable reference source. The signal CSO forms a reference composite sync utilized in the system.

In the foregoing description of the preferred embodiment it has been assumed that the look-up track is located on a common cyclical storage device with the video information signal. However, the invention is not limited thereto. In systems where a large amount of video information is stored on one or more cyclical storage devices, one or more separate cyclical look-up memory devices could be utilized, carrying address information related to the video information. The rotation of these separate look-up address memory devices should be then synchronized with the rotation of said video information storage devices.

Various modifications of the disclosed embodiment, as well as alternate embodiments, may become apparent to those skilled in the art without departing from the scope and spirit of the invention as defined by the appended claims.

TABLE I

| Element | Designation (type) | Manufacturer |
|---|---|---|
| 2-input NAND gate | 7400 | Texas Instruments, Inc. |
| 2-input NOR gate | 7402 | same |
| inverter | 7404 | same |
| 2-input positive AND gate | 7408 or 7409 | same |
| 3-input NAND gate | 7410 | same |
| 3-input positive AND gate | 7411 | same |
| 4-input NAND gate | 7420 | same |
| 8-input NAND gate | 7430 | same |
| dual J-K flip-flop | 7473 | same |
| dual D-type flip-flop | 7474 | same |
| decade, divide by twelve and four-bit binary counter | 7493 | same |
| dual retriggerable monostable multivibrator | 74123 | same |
| 8-bit parallel-out serial shift register | 74164 | same |
| dual carry-save full adder | 74H183 | same |
| 4-bit bistable latch | 7475 | National Semiconductor |
| clock pulse amplifier | MH0026C | same |
| 80-bit circulating register | MM4007 | same |
| 2-phase clock driver | MH0026C | same |
| parallel-load 8-bit shift register | 74165 | Signetics Corporation |
| 4-input 8-bit digital multiplexer | 8233 | same |
| quad exclusive OR comparator | 8241 | Signetics Corporation |
| quad equality comparator | 8242 | same |
| 3 by 1 4-line multiplexer (8-bit position scaler) | 8243 | same |
| VCO phase locked loop | NE562B | same |
| line receiver | 8T14 | same |
| transistor array | CA3046 | Fairchild Camera and Instruments Corp. |
| BCD decode counter | MC9310L | same |
| 4-bit binary counter | MC9316L | same |
| FIFO asynchronous register | FR1502E | Western Digital Corp. |
| transistor array | CA3084 | RCA |
| wideband amplifier | MC1445L | Motorola |

TABLE 2

| Low Order Count From Counter 214 | | | | | High Order Count From Counter 216 | | | | | |
|---|---|---|---|---|---|---|---|---|---|---|
| Q10 | Q11 | Q12 | Q13 | Decimal | Q20 | Q21 | Q22 | Q23 | | Decimal |
| 0 | 0 | 0 | 0 | 0 | 1 | 1 | 0 | 1 | f (0)⟶f(15) | =16 |
| 1 | 0 | 0 | 0 | 1 | 0 | 0 | 1 | 1 | f(16)⟶f(31) | =32 |
| 0 | 1 | 0 | 0 | 2 | 1 | 0 | 1 | 1 | f(32)⟶f(47) | =48 |
| 1 | 1 | 0 | 0 | 3 | 0 | 1 | 1 | 1 | f(48)⟶f(63) | =64 |
| 0 | 0 | 1 | 0 | 4 | 1 | 1 | 1 | 1 | f(64)⟶f(79) | =80 |
| 1 | 0 | 1 | 0 | 5 | | | | | | |
| 0 | 1 | 1 | 0 | 6 | | | | | | |
| 1 | 1 | 1 | 0 | 7 | | | | | | |
| 0 | 0 | 0 | 1 | 8 | | | | | | |
| 1 | 0 | 0 | 1 | 9 | | | | | | |
| 0 | 1 | 0 | 1 | 10 | | | | | | |

TABLE 2-continued

| Low Order Count From Counter 214 | | | | | High Order Count From Counter 216 | | | | |
|---|---|---|---|---|---|---|---|---|---|
| Q10 | Q11 | Q12 | Q13 | Decimal | Q20 | Q21 | Q22 | Q23 | Decimal |
| 1 | 1 | 0 | 1 | 11 | | | | | |
| 0 | 0 | 1 | 1 | 12 | | | | | |
| 1 | 0 | 1 | 1 | 13 | | | | | |
| 0 | 1 | 1 | 1 | 14 | | | | | |
| 1 | 1 | 1 | 1 | 15 | | | | | |

We claim:

1. A system for storing video information on a cyclical storage device and for retrieving it therefrom, comprising:
   a. a cyclical storage device, having: a plurality of video storage segments for storing video information signals;
   b. a cyclical lock-up memory rotating in synchronism with said video storage segments and segmented to store non-sequential distinct addresses related to said video information;
   c. said video storage segments and look-up memory segments, respectively being correlated sequentially with respect to the beginning of each revolution of said cyclical storage device;
   d. a digital computer;
   e. a plurality of command signals generated by said computer to record and reproduce said video information and look-up data, respectively, in accordance with an instant mode of operation of said system; and
   f. an interface device controlled by said computer to direct the transfer of data flow between said cyclical storage device and said cyclical look-up memory.

2. A system for storing video information on a cyclical storage device and for retrieving it therefrom, comprising: combination:
   a. a cyclical storage device, having:
      a plurality of video track segments, each for storing a distinct video information signal;
      2. a plurality of look-up track segments, each for storing look-up data comprising a non-sequential distinct indirect address related to one said distinct video information signal;
      3. said video track segments and look-up track segments, respectively, being numbered sequentially with respect to the beginning of each revolution of said cyclical storage device and each distinct video track segment being permanently related to a distinct look-up track segment;
   b. a movable transducer associated with said cyclical storage device and with related record and playback electronics, respectively;
   c. means for controlling the position of said movable transducer with respect to said cyclical storage device, responsive to a look-up segment number;
   d. means for indicating periodically said look-up track segment numbers with respect to the instant position of the rotating cyclical storage device and in synchronism therewith;
   e. means for entering an indirect address input data into the system;
   f. first means for comparing sequentially said indirect address input data with said indirect address data stored on said look-up track;
   g. first means for storing temporarily an instant look-up track segment number from said indicating means, responsive to an output signal from said comparing means and for transferring said instant look-up segment number to said control means.

3. The system according to claim 2, wherein:
   a. said look-up track is segmented in horizontal line intervals; and
   b. said video tracks are segmented in video field intervals.

4. The system according to claim 2 wherein the rate of rotation of the cyclical storage device is 900 RPM and one track of the cyclical storage device is segmented into four video field intervals.

5. A system according to claim 2, wherein said movable transducer is associated with both the video information and look-up tracks.

6. The system according to claim 2, wherein a computer means is utilized and programmed to control the transfer of said data and video information, respectively, onto and from the cyclical storage device, respectively, in correspondence with a selected instant mode of operation of the system.

7. The system according to claim 2, wherein:
   a. said look-up data further comprises a picture bit indicating whether a related video information is recorded in a corresponding video track segment;
   b. means for evaluating an output signal from said comparing means and for evaluating the presence of a picture bit, respectively, it utilized, said means generating a first input strobe signal in case a coincidence in said comparators occurs and a second input strobe in case no coincidence occurs and a first absent picture bit during one revolution of the cyclical storage device is found, respectively, said respective input strobe signals being applied to said first temporary storage means; and
   c. said first temporary storage means is adapted to store an instant look-up track segment number from said indicating means responsive to said first and second input strobe signal, respectively, and for transferring said segment number to said control means.

8. The system according to claim 7, further comprising:
   second means for comparing sequentially an instant look-up track segment number corresponding to said first absent picture bit, and received from said control means, with a periodical output signal from said indicating means, said second means generating a control signal to enable recording of said look-up data on said look-up track.

9. The system according to claim 2, further comprising:
   a. a source of a distinct video information signal to be recorded in one said video track segment; and
   b. means for transmitting said video information signal to said movable transducer via said record electronics, responsive to a control signal from said control means.

10. The system according to claim 9, further comprising:
   a. a data word related to said video information, said data word to be recorded serially on selected horizontal lines of said video information signal;
   b. means for designating said selected horizontal lines, the frequency of said means being derived from the rotation of the cyclical storage device;
   c. second means for storing temporarily said data word to be recorded in said video information signal, said second storage means receiving a control signal derived from said designating means to enable the transfer of said data from said second storage means, said control signal occurring at the occurrence of each said selected horizontal line;
   d. signal adding means for receiving both said distinct video information signal and said data word to be recorded therein and for transmitting an output signal to said record electronics.

11. The system according to claim 10, wherein subsequent bits of said data word are recorded in subsequent horizontal lines of said video information and wherein the recording of said data word is repeated a number of times for redundancy.

12. The system according to claim 11, further comprising:
   a. a history monitor to display a distinct video information signal retrieved from a video track segment; and
   b. said playback electronics utilized to receive said retrieved video information and to transmit it to said history monitor, responsive to a control signal from said control means.

13. The system according to claim 12, further comprising:
   a. a video and sync stripper circuit for extracting said data word from a video information signal retrieved from said cyclical storage device; and
   b. said second temporary storage means for receiving said data word extracted from said video information signal, and a first and a second control signal derived from said designating means, respectively, said first control signal enabling input of said data into said second temporary storage means and said second signal enabling transfer of said data therefrom.

14. The system according to claim 13, further comprising:
   a. a plurality of majority word registers, each for receiving one said redundant data word supplied by said second temporary storage means; and
   b. a majority word comparator, receiving output signals from said majority word registers and transmitting a majority word to said control means.

15. The system according to claim 13, wherein:
   a. said data word extracted from said video information signal comprises said look-up data related to said video information signal and said look-up segment number;
   said control means is utilized to receive said extracted data and to separate said look-up data therefrom and to transmit said look-up data to said record electronics for recording on said look-up track; and
   c. a second means for comparing said look-up segment number with a periodical output signal of said indicating means and generating a coincidence control signal to enable recording of said look-up data on said look-up track.

16. A system for storage and retrieval of video information, comprising in combination:
   a. cyclical storage device having a plurality of video tracks segmented to store distinct video information signals, a look-up track segmented to store distinct data related to said video information signals, said look-up data comprising a distinct nonsequential indirect address, said video track segments and look-up track segments, respectively, being numbered sequentially and each video track segment being permanently associated with one look-up track segment;
   b. a movable transducer associated with said cyclical storage device, coupled to a record and playback electronics, respectively;
   c. a plurality of input means to enter indirect address data requests;
   d. a plurality of circulating register means each to store a separate indirect address data request;
   e. means for reproducing said indirect address data stored on said look-up track;
   f. a plurality of first comparator means to compare simultaneously the respective output signals of said circulating register means with said indirect address data reproduced from said look-up track;
   g. a plurality of latch means to store the respective output signals of said comparator means, each respective latch means associated with one said input means;
   h. a clock generator having its frequency derived from the rotation of said cyclical storage device;
   i. gating means for producing a control signal when a comparison at any of said comparators is found;
   j. decoding means for receiving said control signal and generating first input strobe signal, responsive to said control signal;
   k. a look-up track segment counter driven by said clock generator indicating the instant position of the look-up track segments with respect to the beginning of each recubirtion of said cyclical storage device;
   l. first asynchronous register means for storing an output signal from said look-up track segment counter and an output signal from said latch means respectively, upon receiving said first input strobe signal, said output signal from said look-up track segment counter identifying a specific look-up segment number and said output signal from said latch means identifying a specific input means associated therewith; and
   m. control means receiving an output signal from said first asynchronous register means and applying a control signal to position said movable transducer.

17. A system for storing and/or retrieving at least one field of television-type information signals on/from a selected segment of a plurality of tracks of a rotating media device characterized by:
- at least one of the tracks being reserved for recording playback of address data peculiar to each stored television field located in segments of the address data track, which segments individually relate to a particular portion of each of the plurality of tracks;
- said address data being distinct and non-correlated with each-other;
- control means for developing command signals in response to input signals;
- comparison means receiving media position signals from the rotating media device;
- address request signal means connected to the control means for developing and transmitting a command signal to the rotating media device to playback the address data track and connected to the comparison means;
- means coupling playback address track data signals to the comparison means for developing a first output signal in response to coincidence between address request and playback address signals, and a second output signal in response to coincidence between address request and playback address signals, and a second output signal in response to non-coincidence between such signals and to the first segment of the playback address data indicating a related unoccupied television field segment;
- television camera means; and
- means coupling the second output signal of the comparison means to the control means for developing and transmitting a control signal to the rotating media device to record the address data signal in the first segment of the playback address track indicating said related unoccupied television field and to record the related television information on the corresponding segment of the plurality of tracks.

18. The system according to claim 17 chracterized by:
- means connected to receive television information signals from the camera and to receive the related address data signal to develope an output signal with the address data signal inserted on selected horizontal lines of the television signal for recording on the rotating media device.

19. A system for storing distinct video signals on a cyclical storage device and for retrieving it therefrom, each distinct video signal comprising video information and a distinct non-sequential address signal inserted therein, comprising:
- a. a cyclical storage means for storing distinct video signals at separate video signal storage segments;
- b. a cyclical look-up storage means for storing distinct non-sequential address signals at separate look-up data storage segments, said look-up storage means cycled in synchronism with said cyclical storage means, said video signal storage segments and look-up data storage segments correlated with respect to the beginning of each cycle of said cyclical storage means;
- c. movable transducer means for receiving and transferring said distinct video signals with respect to said video signal storage segments and for receiving and transferring distinct address signals with respect to look-up data storage segments;
- d. means for comparing an input-requested address signal with distinct address signals stored in the cyclical look-up storage means; and
- e. command signal generator means responsive to said comparison means to generate control signals selectively to effect recording of received distinct video signals and distinct address signals and to effect reproduction of distinct video signals.

20. The system according to claim 19 further comprising means for extracting said distinct address signals from video signals reproduced from said video signal segments, said receiving and transferring means coupled to receive said extracted address signals and to record them in said look-up data storage segments.

* * * * *